United States Patent
Haga et al.

(10) Patent No.: US 11,732,341 B2
(45) Date of Patent: Aug. 22, 2023

(54) METAL COATED STEEL SHEET, MANUFACTURING METHOD OF HOT-DIP GALVANIZED STEEL SHEET, AND MANUFACTURING METHOD OF ALLOYED GALVANNEALED STEEL SHEET

(71) Applicant: NIPPON STEEL & SUMITOMO METAL CORPORATION, Tokyo (JP)

(72) Inventors: Jun Haga, Tokyo (JP); Kohichi Sano, Tokyo (JP); Koutarou Hayashi, Tokyo (JP); Kunio Hayashi, Tokyo (JP); Masaharu Kameda, Tokyo (JP); Akihiro Uenishi, Tokyo (JP); Hiroyuki Kawata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 231 days.

(21) Appl. No.: 16/332,329

(22) PCT Filed: Oct. 19, 2016

(86) PCT No.: PCT/JP2016/081018
§ 371 (c)(1),
(2) Date: Mar. 11, 2019

(87) PCT Pub. No.: WO2018/073919
PCT Pub. Date: Apr. 26, 2018

(65) Prior Publication Data
US 2019/0218652 A1  Jul. 18, 2019

(51) Int. Cl.
*C23C 2/28* (2006.01)
*C22C 38/22* (2006.01)
(Continued)

(52) U.S. Cl.
CPC .............. *C23C 2/28* (2013.01); *B32B 15/01* (2013.01); *C21D 1/25* (2013.01); *C21D 6/001* (2013.01);
(Continued)

(58) Field of Classification Search
CPC .. B32B 15/01; C21D 9/46; C21D 9/48; C22C 38/00; C23C 2/02; C23C 2/06; C23C 2/40
(Continued)

(56) References Cited

U.S. PATENT DOCUMENTS 9,988,700 B2 *   6/2018  Minami ................... C23C 2/06
10,787,727 B2 *  9/2020  Hayashi ................. C22C 38/14
(Continued)

FOREIGN PATENT DOCUMENTS

CN      103717771 A    4/2014
EP      2258886 A1    12/2010
(Continued)

OTHER PUBLICATIONS

NPL-1: AISI S903-13, Standard method for determination of uniform and local ductility (2013 edition) (Year: 2013).*
(Continued)

*Primary Examiner* — Jie Yang
(74) *Attorney, Agent, or Firm* — Birch, Stewart, Kolasch & Birch, LLP

(57) ABSTRACT

In a metal coated steel sheet, a chemical composition contains, in mass %, at least C: 0.03% to 0.70%, Si: 0.25% to 2.50%, Mn: 1.00% to 5.00%, P: 0.100% or less, S: 0.010% or less, sol. Al: 0.001% to 2.500, N: 0.020% or less, and a balance composed of iron and impurities, a metal structure contains greater than 5.0 vol % of retained austenite and greater than 5.0 vol % of tempered martensite, and satisfies a C content in the retained austenite being 0.85 mass % or more.

13 Claims, 2 Drawing Sheets

(51) Int. Cl.
| | |
|---|---|
| *C22C 38/16* | (2006.01) |
| *C22C 38/14* | (2006.01) |
| *C22C 38/08* | (2006.01) |
| *C22C 38/06* | (2006.01) |
| *C22C 38/02* | (2006.01) |
| *C22C 38/00* | (2006.01) |
| *B32B 15/01* | (2006.01) |
| *C23C 2/02* | (2006.01) |
| *C23C 2/40* | (2006.01) |
| *C21D 9/46* | (2006.01) |
| *C21D 6/00* | (2006.01) |
| *C22C 38/38* | (2006.01) |
| *C21D 1/25* | (2006.01) |
| *C22C 38/58* | (2006.01) |
| *C21D 8/04* | (2006.01) |
| *C23C 2/06* | (2006.01) |
| *C21D 9/48* | (2006.01) |

(52) U.S. Cl.
CPC ............. *C21D 6/002* (2013.01); *C21D 6/005* (2013.01); *C21D 6/008* (2013.01); *C21D 8/0442* (2013.01); *C21D 8/0473* (2013.01); *C21D 9/46* (2013.01); *C21D 9/48* (2013.01); *C22C 38/00* (2013.01); *C22C 38/001* (2013.01); *C22C 38/002* (2013.01); *C22C 38/005* (2013.01); *C22C 38/02* (2013.01); *C22C 38/06* (2013.01); *C22C 38/08* (2013.01); *C22C 38/14* (2013.01); *C22C 38/16* (2013.01); *C22C 38/22* (2013.01); *C22C 38/38* (2013.01); *C22C 38/58* (2013.01); *C23C 2/02* (2013.01); *C23C 2/06* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
USPC ......................................................... 148/533
See application file for complete search history.

(56) References Cited

U.S. PATENT DOCUMENTS

| | | | | |
|---|---|---|---|---|
| 2003/0106622 A1* | 6/2003 | Matsuoka | ............... | C22C 38/04 148/603 |
| 2008/0202639 A1* | 8/2008 | Tomida | .................. | C22C 38/06 148/506 |
| 2011/0139315 A1 | 6/2011 | Nakagaito et al. | | |
| 2013/0284321 A1 | 10/2013 | Bocharova et al. | | |
| 2013/0295410 A1 | 11/2013 | Takahashi et al. | | |
| 2014/0205855 A1* | 7/2014 | Kawata | ................... | C22C 38/02 428/632 |
| 2014/0212686 A1* | 7/2014 | Imai | ....................... | C22C 38/06 428/659 |
| 2014/0234660 A1 | 8/2014 | Kawata et al. | | |
| 2014/0242414 A1 | 8/2014 | Minami et al. | | |
| 2014/0287263 A1* | 9/2014 | Kawata | ................. | B32B 15/013 428/659 |
| 2014/0377584 A1 | 12/2014 | Hasegawa et al. | | |
| 2015/0225830 A1 | 8/2015 | Nonaka et al. | | |
| 2018/0002800 A1 | 1/2018 | Hasegawa et al. | | |

FOREIGN PATENT DOCUMENTS

| | | |
|---|---|---|
| EP | 2738278 A1 | 6/2014 |
| JP | 61-157625 A | 7/1986 |
| JP | 61-217529 A | 9/1986 |
| JP | 11-279691 A | 10/1999 |
| JP | 2001-192768 A | 7/2001 |
| JP | 2009-249737 A | 10/2009 |
| JP | 2012-117148 A | 6/2012 |
| JP | 2013-540901 A | 11/2013 |
| JP | 2013-241636 A | 12/2013 |
| JP | 2014-34716 A | 2/2014 |
| KR | 10-2014-0043156 A | 4/2014 |
| TW | 201329251 A1 | 7/2013 |
| WO | WO 2009/096344 A1 | 8/2009 |
| WO | WO 2013/018741 A1 | 2/2013 |
| WO | WO 2014/024831 A1 | 2/2014 |
| WO | WO 2016/113789 A1 | 7/2016 |
| WO | WO 2016/136627 A1 | 9/2016 |

OTHER PUBLICATIONS

International Search Report for PCT/JP2016/081018 dated Jan. 24, 2017.
Written Opinion of the International Searching Authority for PCT/JP2016/081018 (PCT/ISA/237) dated Jan. 24, 2017.
Notification of Transmittal of Translation of the International Preliminary Report on Patentability; International Preliminary Report on Patentability and English Translation of Written Opinion of the International Searching Authority issued for PCT/JP2016/081018, dated May 2, 2019 (Forms PCT/IB/338, PCT/IB/373 and PCT/IB/237).
Korean Office Action for corresponding Korean Application No. 10-2019-7007499, dated Jun. 1, 2020.
Extended European Search Report for corresponding European Application No. 16919237.4, dated Feb. 11, 2020.

* cited by examiner

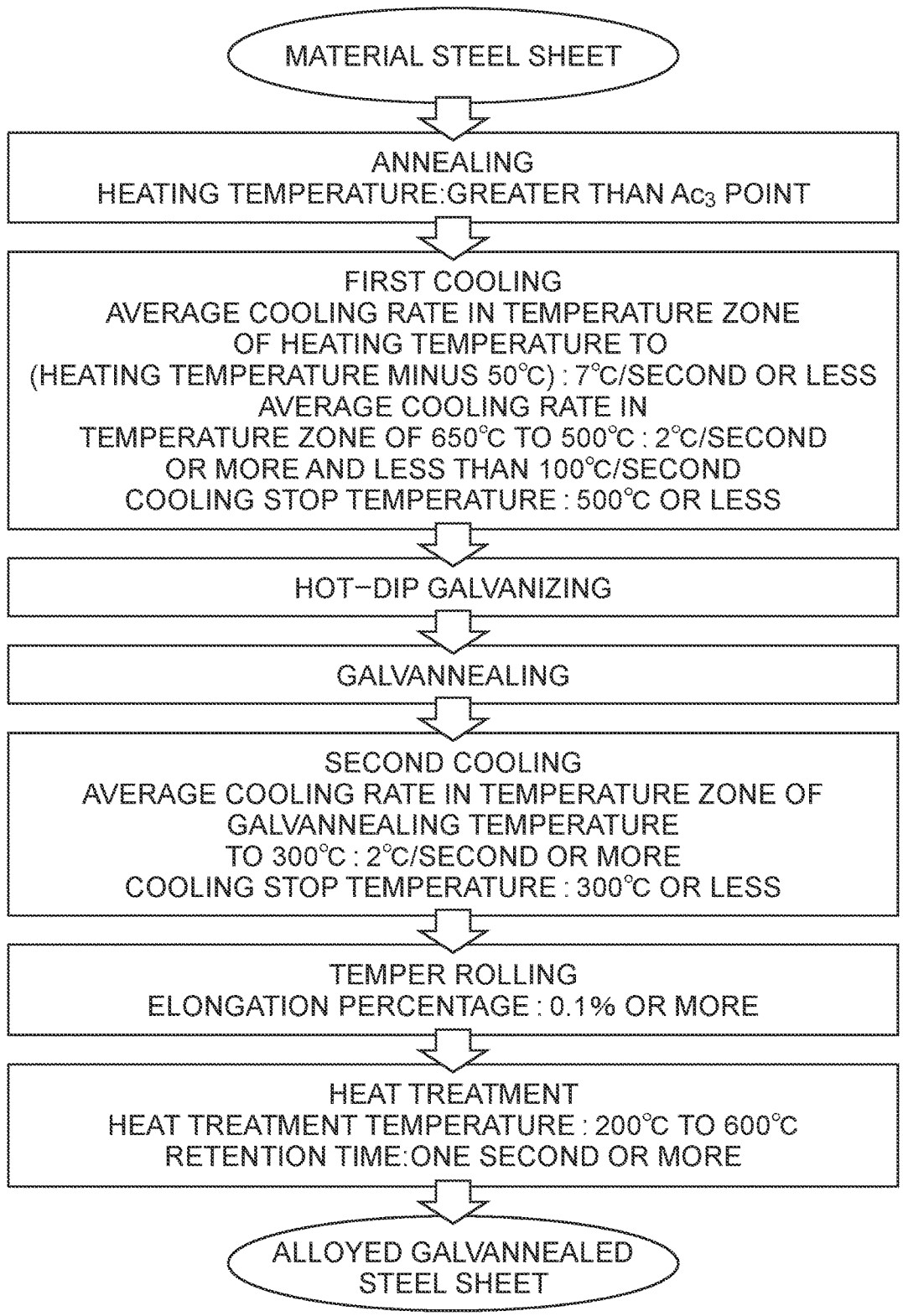

METAL COATED STEEL SHEET, MANUFACTURING METHOD OF HOT-DIP GALVANIZED STEEL SHEET, AND MANUFACTURING METHOD OF ALLOYED GALVANNEALED STEEL SHEET

TECHNICAL FIELD

The present invention relates to a metal coated steel sheet, a manufacturing method of a hot-dip galvanized steel sheet, and an alloyed galvannealed steel sheet. The present invention relates to a high-strength hot-dip galvanized steel sheet and a high-strength alloyed galvannealed steel sheet that are excellent in uniform ductility and local ductility, which are suitable for press forming for particularly an automobile vehicle body, and their manufacturing methods.

BACKGROUND ART

In these days when industrial technical fields are highly divided, the material to be used in each technical field has been required to have special and sophisticated performance. The automobile steel sheet has been required to have high strength for the improvement of fuel efficiency achieved by vehicle body weight reduction. The strength means both a yield strength and a tensile strength.

When a high-strength steel sheet is applied to an automobile vehicle body, it is possible to give a desired strength to the vehicle body while reducing the weight of the vehicle body by thinning the sheet thickness of the steel sheet. However, in press forming to form the vehicle body of the automobile, cracking or creases are more likely to occur as the thickness of the steel sheet to be used is thinner. Therefore, an automobile thin steel sheet also needs to have excellent uniform ductility and local ductility.

Further, in order to improve the collision safety performance of the automobile, the automobile steel sheet needs to have excellent impact absorbability. From the viewpoint of impact absorbability, the automobile steel sheet needs to be excellent in local ductility in order to suppress cracking to occur when an impact load is loaded as well as to be higher in strength.

As above, the automobile steel sheet is required to have (1) high strength for the vehicle body weight reduction and the collision safety performance improvement, (2) high uniform ductility for the formability improvement, and (3) high local ductility for the formability improvement and the collision safety performance improvement.

However, the improvement of the uniform ductility and the local ductility of the steel sheet, and having the high strength of the steel sheet are the factors contrary to each other, and it is difficult to satisfy these properties simultaneously. Further, the automobile steel sheet is required to have corrosion resistance, but maintaining the corrosion resistance makes it further difficult to achieve both high ductility and high strength.

As a method of improving the ductility of a high-tensile cold-rolled steel sheet, a technique to contain retained austenite in a metal structure has been proposed so far. A steel sheet containing retained austenite exhibits large elongation by transformation induced plasticity (TRIP) to occur by austenite transforming into martensite during working.

In Patent Literatures 1 and 2, there has been disclosed a manufacturing method of a high-strength cold-rolled steel sheet in which austenite is stabilized by performing an austempering treatment in which a steel sheet containing Si and Mn is heated to a ferrite-austenite two-phase region or an austenite single-phase region to be annealed and cooled and is retained at 350 to 500° C. These techniques make it possible to improve the strength and the ductility in the cold-rolled steel sheet in a well-balanced manner.

However, in the manufacture of a hot-dip galvanized steel sheet and an alloyed galvannealed steel sheet, it is impossible to perform the austempering treatment sufficiently in a general continuous hot-dip galvanizing facility because of the restriction of a retention temperature and a retention time. Further, austenite is easily decomposed in a plating step and a galvannealing step, and thus it is difficult to secure a required amount of retained austenite.

In Patent Literature 3, there has been disclosed a manufacturing method of a high-strength alloyed galvannealed steel sheet in which Si and Mn are contained by a certain percentage or more relative to C to thereby suppress transformation of austenite during a galvannealing and form a metal structure with retained austenite mixing in ferrite. However, no consideration is given to the deterioration in local ductility to be the problem in the steel sheet containing retained austenite in a metal structure.

In Patent Literature 4, there has been disclosed a high-tensile hot-dip galvanized steel sheet excellent in ductility, stretch flangeability, and fatigue resistance in which retained austenite and low-temperature transformation generating phases are dispersed in ferrite and tempered martensite with an average crystal grain diameter of 10 μm or less. The tempered martensite is effective for improving the stretch flangeability and the fatigue resistance, and when the tempered martensite is made fine, these properties further improve.

However, obtaining the metal structure containing tempered martensite and retained austenite requires primary heating for generating martensite and secondary heating for tempering the martensite and further obtaining retained austenite, and thus the productivity decreases drastically. Further, in the manufacturing method described in Patent Literature 4, the secondary heating is performed at high temperature of the $Ac_1$ point or more, and thus the tempered martensite softens excessively, resulting in that it is difficult to obtain high strength.

As above, since the strength (yield strength and tensile strength) and the ductility (uniform ductility and local ductility) are the factors contrary to each other, it is difficult to manufacture the steel sheet in which the both are sufficiently increased in the prior arts.

CITATION LIST

Patent Literature

Patent Literature 1: Japanese Laid-open Patent Publication No. 61-157625
Patent Literature 2: Japanese Laid-open Patent Publication No. 61-217529
Patent Literature 3: Japanese Laid-open Patent Publication No. 11-279691
Patent Literature 4: Japanese Laid-open Patent Publication No. 2001-192768

SUMMARY OF INVENTION

Technical Problem

In consideration of such a technical background, an object of the present invention is to provide a metal coated steel sheet that is excellent in uniform ductility and local ductility, high in yield strength and tensile strength, and further excellent in formability and impact absorbability, a manufacturing method of a hot-dip galvanized steel sheet, and a manufacturing method of an alloyed galvannealed steel sheet.

Solution to Problem

The present inventors earnestly examined a method of improving the uniform ductility and the local ductility while securing the tensile strength and the yield strength in a hot-dip galvanized steel sheet and an alloyed galvannealed steel sheet. As a result, they obtained the following findings (A) to (E).

(A) When a low-carbon hot-dip galvanized steel sheet containing Si and Mn or a low-carbon alloyed galvannealed steel sheet containing Si and Mn is manufactured in a continuous hot-dip galvanizing facility, the uniform ductility and the local ductility decrease and further the yield strength also decreases in some cases. This is conceivably because in the continuous hot-dip galvanizing facility, the austempering treatment becomes insufficient and a metal structure containing retained austenite with a low C concentration and hard martensite is formed.

(B) However, when a hot-dip galvanized steel sheet and an alloyed galvannealed steel sheet each having such a metal structure containing retained austenite with a low C concentration and hard martensite are reheated, of the hot-dip galvanized steel sheet and the alloyed galvannealed steel sheet, the uniform ductility and the local ductility improve and further the yield strength also improves.

The reason for this is unclear, but this is estimated to be due to (a) the fact that C concentration to austenite occurs during the reheating and the stability of austenite increases and (b) the fact that the hard martensite is tempered to be changed into soft tempered martensite.

(C) When the hot-dip galvanized steel sheet and the alloyed galvannealed steel sheet are subjected to temper rolling before performing the aforementioned reheating, of the hot-dip galvanized steel sheet or the alloyed galvannealed steel sheet, the uniform ductility and the local ductility further improve and the yield strength also further improves.

The reason for this is unclear, but this is estimated to be due to (a) the fact that by the temper rolling, dislocation is introduced into austenite, the C concentration to austenite during the subsequent reheating is promoted, and at the same time, Mn also concentrates, and the stability of austenite further improves, (b) the fact that by the temper rolling, part of the austenite is transformed into martensite and in the metal structure after the reheating, the tempered martensite increases, and (c) the fact that martensite transformation that is able to occur during cooling after the reheating is suppressed and in the metal structure after the reheating, the hard martensite decreases.

(D) The effect of improving the properties achieved by the temper rolling increases as the content of austenite is smaller in the metal structure of the hot-dip galvanized steel sheet and the alloyed galvannealed steel sheet that are subjected to temper rolling.

The reason for this is unclear, but this is estimated to be due to (a) the fact that working strain concentrates in austenite and as the content of austenite is smaller, the amount of dislocation to be introduced into austenite increases and (b) the fact that thereby, the C concentration and the Mn concentration to austenite during the reheating are promoted and the stability of austenite further increases.

(E) In the metal structure of the hot-dip galvanized steel sheet and the alloyed galvannealed steel sheet that are manufactured by performing temper rolling and reheating, polygonal ferrite is contained in addition to the retained austenite and the tempered martensite, and thereby, of the hot-dip galvanized steel sheet and the alloyed galvannealed steel sheet, the uniform ductility further improves without impairment of the local ductility.

The reason for this is unclear, but this is estimated to be due to (a) the fact that the Mn concentration in the retained austenite increases and the stability of austenite increases and (b) the fact that Mn in austenite normally prevents the C concentration to austenite, but the temper rolling and the reheating are performed, and thereby the C concentration to austenite is promoted and the C concentration in the retained austenite is secured.

The present inventors further learned based on the above findings of (A) to (E) that after being subjected to hot-dip galvanizing or being subjected to hot-dip galvanizing and further being subjected to a galvannealing, a steel sheet (material steel sheet) is subjected to temper rolling to be reheated, thereby making it possible to manufacture a hot-dip galvanized steel sheet and an alloyed galvannealed steel sheet that have a metal structure containing retained austenite with a high C concentration and a high Mn concentration, tempered martensite, and polygonal ferrite, are excellent in uniform ductility and local ductility, and further high in yield strength and tensile strength.

The present invention was completed based on the above-described findings, and the gist thereof is as follows. Incidentally, in the present invention, the "steel sheet" includes a "steel strip."

(1) A metal coated steel sheet, in which
a chemical composition contains, in mass %,
C: 0.03% to 0.70%,
Si: 0.25% to 2.50%,
Mn: 1.00% to 5.00%,
P: 0.100% or less,
S: 0.010% or less,
sol. Al: 0.001% to 2.500%,
N: 0.020% or less,
Ti: 0% to 0.300%,
Nb: 0% to 0.300%,
V: 0% to 0.300%,
Cr: 0% to 2.000%,
Mo: 0% to 2.000%,
B: 0% to 0.0200%,
Cu: 0% to 2.000%,
Ni: 0% to 2.000%,
Ca: 0% to 0.0100%,
Mg: 0% to 0.0100%,
REM: 0% to 0.1000%,
Bi: 0% to 0.0500%, and
a balance composed of iron and impurities,
a metal structure contains greater than 5.0 vol % of retained austenite and greater than 5.0 vol % of tempered martensite, and
a C content in the retained austenite is 0.85 mass % or more.

(2) The metal coated steel sheet according to (1), in which
the metal structure further contains greater than 2.0 vol % of polygonal ferrite, and
a Mn content in the retained austenite satisfies Expression (1) below.

$$[Mn]_\gamma/[Mn]_{ave} \geq 1.10 \qquad (1)$$

$[Mn]_\gamma$: Mn content in retained austenite (mass %)
$[Mn]_{ave}$: Mn content of the chemical composition of the steel sheet (mass %)

(3) The metal coated steel sheet according to (1) or (2), in which
the chemical composition further contains, in mass %, one type or two types or more selected from the group consisting of
Ti: 0.001% to 0.300%,
Nb: 0.001% to 0.300%, and
V: 0.001% to 0.300%.

(4) The metal coated steel sheet according to any one of (1) to (3), in which
the chemical composition further contains, in mass %, one type or two types or more selected from the group consisting of
Cr: 0.001% to 2.000%,
Mo: 0.001% to 2.000%, and
B: 0.0001% to 0.0200%.

(5) The metal coated steel sheet according to any one of (1) to (4), in which
the chemical composition further contains, in mass %, one type or two types selected from the group consisting of
Cu: 0.001% to 2.000%, and
Ni: 0.001% to 2.000%.

(6) The metal coated steel sheet according to any one of (1) to (5), in which
the chemical composition further contains, in mass %, one type or two types or more selected from the group consisting of
Ca: 0.0001% to 0.0100%,
Mg: 0.0001% to 0.0100%, and
REM: 0.0001% to 0.1000%.

(7) The metal coated steel sheet according to any one of (1) to (6), in which
the chemical composition further contains, in mass %,
Bi: 0.0001% to 0.0500%.

(8) The metal coated steel sheet according to any one of (1) to (7), in which
the metal coated steel sheet is a hot-dip galvanized steel sheet including a hot-dip galvanizing layer.

(9) The metal coated steel sheet according to any one of (1) to (7), in which
the metal coated steel sheet is an alloyed galvannealed steel sheet including an alloyed galvannealing layer.

(10) A manufacturing method of a hot-dip galvanized steel sheet, comprising:
a step of performing annealing by heating, to greater than Ac1 point, an original material steel sheet having a chemical composition contains, in mass %,
C: 0.03% to 0.70%,
Si: 0.25% to 2.50%,
Mn: 1.00% to 5.00%,
P: 0.100% or less,
S: 0.010% or less,
sol. Al: 0.001% to 2.500%,
N: 0.020% or less,
Ti: 0% to 0.300%,
Nb: 0% to 0.300%,
V: 0% to 0.300%,
Cr: 0% to 2.000%,
Mo: 0% to 2.000%,
B: 0% to 0.0200%,
Cu: 0% to 2.000%,
Ni: 0% to 2.000%,
Ca: 0% to 0.0100%,
Mg: 0% to 0.0100%,
REM: 0% to 0.1000%,
Bi: 0% to 0.0500%, and
a balance composed of iron and impurities;

a step of performing first cooling, wherein the annealed material steel sheet is cooled at an average cooling rate of 2° C./second or more and less than 100° C./second in a temperature zone of 650° C. to 500° C. and further cooled down to 500° C. or less after the step of performing the annealing;

a step of performing hot-dip galvanizing on the first cooled material steel sheet after the step of performing the first cooling;

a step of performing second cooling, wherein the hot-dip galvanized material steel sheet is cooled from a plating temperature in the step of performing hot-dip galvanizing to 300° C. at an average cooling rate of 2° C./second or more and further cooled down to 300° C. or less after the step of performing the hot-dip galvanizing;

a step of performing temper rolling on the secondary cooled material steel sheet at an elongation percentage of 0.10% or more after the step of performing the second cooling; and a step of performing a heat treatment, wherein the temper rolled material steel sheet is heated to a temperature between 200° C. and 600° C. and retained for 1 second or more after the step of performing the temper rolling.

(11) The manufacturing method of the hot-dip galvanized steel sheet according to (10), wherein
in the step of performing the annealing, the original material steel sheet is heated to greater than the $Ac_3$ point and annealed, and
after the step of performing the annealing, the annealed material steel sheet is cooled at an average cooling rate of 7° C./second or less in a temperature zone of the heating temperature to the heating temperature minus 50° C.

(12) A manufacturing method of an alloyed galvannealed steel sheet, comprising:
a step of performing annealing by heating, to greater than the $Ac_1$ point, an original material steel sheet having a chemical composition contains, in mass %,
C: 0.03% to 0.70%,
Si: 0.25% to 2.50%,
Mn: 1.00% to 5.00%,
P: 0.100% or less,
S: 0.010% or less,
sol. Al: 0.001% to 2.500%,
N: 0.020% or less,
Ti: 0% to 0.300%,
Nb: 0% to 0.300%,
V: 0% to 0.300%,
Cr: 0% to 2.000%,
Mo: 0% to 2.000%,
B: 0% to 0.0200%,
Cu: 0% to 2.000%,
Ni: 0% to 2.000%,
Ca: 0% to 0.0100%,
Mg: 0% to 0.0100%,
REM: 0% to 0.1000%,
Bi: 0% to 0.0500%, and
a balance composed of iron and impurities;

a step of performing first cooling, wherein the annealed material steel sheet is cooled at an average cooling rate of 2° C./second or more and less than 100° C./second in a temperature zone of 650° C. to 500° C. and further cooled down to 500° C. or less after the step of performing the annealing;

a step of performing hot-dip galvanizing on the first cooled material steel sheet after the step of performing the first cooling;

a step of performing galvannealing the hot-dip galvanized material steel sheet at galvannealing temperature after the step of performing the hot-dip galvanizing;

a step of performing second cooling, wherein the alloyed galvannealed material steel sheet is cooled from the galvannealing temperature to 300° C. at an average cooling rate of 2° C./second or more and further cooled down to 300° C. or less after the step of performing the galvannealing;

a step of performing temper rolling on the secondary cooled material steel sheet at an elongation percentage of 0.10% or more after the step of performing the second cooling; and a step of performing a heat treatment, wherein the temper rolled material steel sheet is heated to a temperature between 200° C. and 600° C. and retained for 1 second or more after the step of performing the temper rolling.

(13) The manufacturing method of the alloyed galvannealed steel sheet according to (12), wherein in the step of performing the annealing, the original material steel sheet is heated to greater than the $Ac_3$ point, and annealed, and after the step of performing the annealing, the annealed material steel sheet is cooled at an average cooling rate of 7° C./second or less in a temperature zone of the heating temperature to the heating temperature minus 50° C.

Advantageous Effects of Invention

According to the present invention, it is possible to manufacture and provide a hot-dip galvanized steel sheet and an alloyed galvannealed steel sheet that are excellent in uniform ductility and local ductility, high in yield strength and tensile strength, and further excellent in formability and impact absorbability.

BRIEF DESCRIPTION OF DRAWINGS

FIG. 2 is a view for explaining a method of manufacturing an alloyed galvannealed steel sheet.

DESCRIPTION OF EMBODIMENTS

Figure 1:
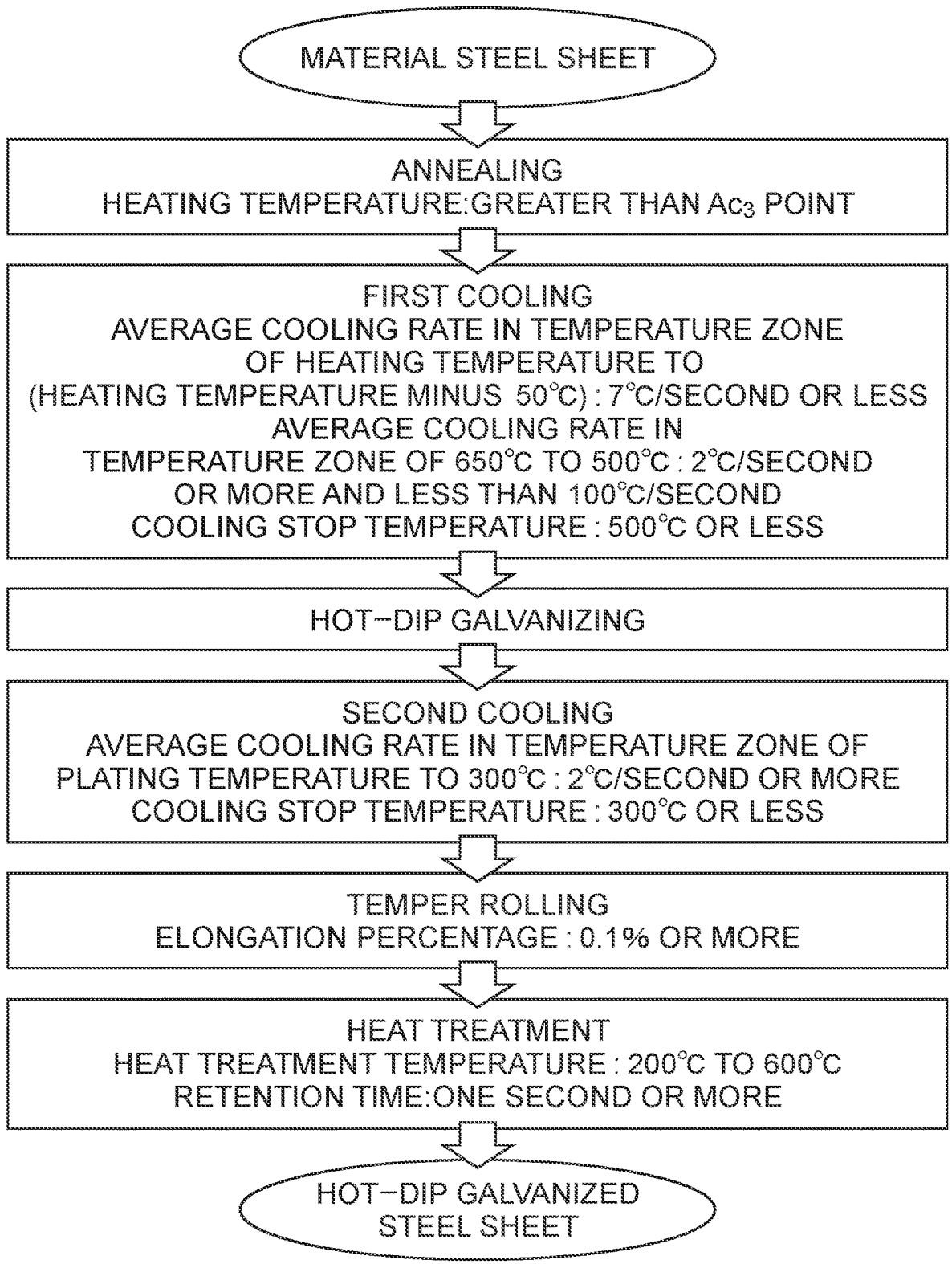
FIG. 1 is a view for explaining a method of manufacturing a hot-dip galvanized steel sheet.

A metal coated steel sheet of the present invention, in which a chemical composition contains, in mass %,
C: 0.03% to 0.70%,
Si: 0.25% to 2.50%,
Mn: 1.00% to 5.00%,
P: 0.100% or less,
S: 0.010% or less,
sol. Al: 0.001% to 2.500%,
N: 0.020% or less,
Ti: 0% to 0.300%,
Nb: 0% to 0.300%,
V: 0% to 0.300%,
Cr: 0% to 2.000%,
Mo: 0% to 2.000%,
B: 0% to 0.0200%,
Cu: 0% to 2.000%,
Ni: 0% to 2.000%,
Ca: 0% to 0.0100%,
Mg: 0% to 0.0100%,
REM: 0% to 0.1000%,
Bi: 0% to 0.0500%, and
a balance composed of iron and impurities, a metal structure contains greater than 5.0 vol % of retained austenite and greater than 5.0 vol % of tempered martensite, and a C content in the retained austenite is 0.85 mass % or more.

The metal coated steel sheet of the present invention is a hot-dip galvanized steel sheet including a hot-dip galvanizing layer.

The metal coated steel sheet of the present invention is an alloyed galvannealed steel sheet including an alloyed galvannealing layer.

A manufacturing method of a hot-dip galvanized steel sheet of the present invention includes:

a step of performing annealing by heating, to greater than Ac1 point, an original material steel sheet having a chemical composition contains, in mass %,
C: 0.03% to 0.70%,
Si: 0.25% to 2.50%,
Mn: 1.00% to 5.00%,
P: 0.100% or less,
S: 0.010% or less,
sol. Al: 0.001% to 2.500%,
N: 0.020% or less,
Ti: 0% to 0.300%,
Nb: 0% to 0.300%,
V: 0% to 0.300%,
Cr: 0% to 2.000%,
Mo: 0% to 2.000%,
B: 0% to 0.0200%,
Cu: 0% to 2.000%,
Ni: 0% to 2.000%,
Ca: 0% to 0.0100%,
Mg: 0% to 0.0100%,
REM: 0% to 0.1000%,
Bi: 0% to 0.0500%, and
a balance composed of iron and impurities;

a step of performing first cooling, wherein the annealed material steel sheet is cooled at an average cooling rate of 2° C./second or more and less than 100° C./second in a temperature zone of 650° C. to 500° C. and further cooled down to 500° C. or less after the step of performing the annealing;

a step of performing hot-dip galvanizing on the first cooled material steel sheet after the step of performing the first cooling;

a step of performing second cooling, wherein the hot-dip galvanized material steel sheet is cooled from a plating temperature in the step of performing hot-dip galvanizing to 300° C. at an average cooling rate of 2° C./second or more and further cooled down to 300° C. or less after the step of performing the hot-dip galvanizing;

a step of performing temper rolling on the secondary cooled material steel sheet at an elongation percentage of 0.10% or more after the step of performing the second cooling; and a step of performing a heat treatment, wherein the temper rolled material steel sheet is heated to a temperature between 200° C. and 600° C. and retained for 1 second or more after the step of performing the temper rolling.

A manufacturing method of an alloyed galvannealed steel sheet of the present invention includes:

a step of performing annealing by heating, to greater than the $Ac_1$ point, an original material steel sheet having a chemical composition contains, in mass %,
C: 0.03% to 0.70%,
Si: 0.25% to 2.50%,
Mn: 1.00% to 5.00%, P: 0.100% or less,
S: 0.010% or less,
sol. Al: 0.001% to 2.500%,
N: 0.020% or less,
Ti: 0% to 0.300%,
Nb: 0% to 0.300%,
V: 0% to 0.300%,
Cr: 0% to 2.000%,
Mo: 0% to 2.000%,
B: 0% to 0.0200%,
Cu: 0% to 2.000%,
Ni: 0% to 2.000%,
Ca: 0% to 0.0100%,
Mg: 0% to 0.0100%,
REM: 0% to 0.1000%,
Bi: 0% to 0.0500%, and
a balance composed of iron and impurities;

a step of performing first cooling, wherein the annealed material steel sheet is cooled at an average cooling rate of 2° C./second or more and less than 100° C./second in a temperature zone of 650° C. to 500° C. and further cooled down to 500° C. or less after the step of performing the annealing;

a step of performing hot-dip galvanizing on the first cooled material steel sheet after the step of performing the first cooling;

a step of performing galvannealing the hot-dip galvanized material steel sheet at galvannealing temperature after the step of performing the hot-dip galvanizing;

a step of performing second cooling, wherein the alloyed galvannealed material steel sheet is cooled from the galvannealing temperature to 300° C. at an average cooling rate of 2° C./second or more and further cooled down to 300° C. or less after the step of performing the galvannealing;

a step of performing temper rolling on the secondary cooled material steel sheet at an elongation percentage of 0.10% or more after the step of performing the second cooling; and a step of performing a heat treatment, wherein the temper rolled material steel sheet is heated to a temperature between 200° C. and 600° C. and retained for 1 second or more after the step of performing the temper rolling.

Hereinafter, there will be explained a hot-dip galvanized steel sheet, an alloyed galvannealed steel sheet, and their manufacturing methods in this embodiment. In the following explanation, unless otherwise noted, the steel sheet to be obtained finally by the manufacturing method according to this embodiment is referred to as a "hot-dip galvanized steel sheet," an "alloyed galvannealed steel sheet," or a "steel sheet," and the steel sheet in the middle of manufacture is referred to as a "material steel sheet."

(A) Chemical Composition

First, there will be explained reasons for limiting the chemical composition of the hot-dip galvanized steel sheet, the alloyed galvannealed steel sheet, and the material steel sheet to be used for their manufacturing methods according to this embodiment. Hereinafter, % relating to the chemical composition manes mass %.

[C: 0.03% to 0.70%]

C is an element effective for obtaining retained austenite. When the C content is less than 0.03%, it is impossible to obtain the later-described metal structure containing retained austenite and tempered martensite, and thus the C content is set to 0.03% or more. The C content is preferably 0.10% or more, more preferably 0.13% or more, and further preferably 0.16% or more.

On the other hand, when the C content exceeds 0.70%, weldability of the steel sheet decreases significantly, and thus the C content is set to 0.70% or less. The C content is preferably 0.30% or less, more preferably 0.26% or less, and further preferably 0.24% or less.

[Si: 0.25% to 2.50%]

Si is an element that exhibits a function of suppressing precipitation of cementite and promoting generation of retained austenite. Further, Si is also an element that exhibits a function of preventing excessive softening of tempered martensite and maintaining strength. When the Si content is less than 0.25%, the effects are not exhibited sufficiently, and thus the Si content is set to 0.25% or more. The Si content is preferably greater than 0.60%, more preferably greater than 1.00%, and further preferably greater than 1.45%.

On the other hand, when the Si content exceeds 2.50%, platability of the steel sheet decreases significantly, and at the same time, the weldability of the steel sheet decreases, and thus the Si content is set to 2.50% or less. The Si content is preferably 2.30% or less, more preferably 2.10% or less, and further preferably 1.90% or less.

[Mn: 1.00% to 5.00%]

Mn has a function of improving hardenability of the steel, and is an element effective for obtaining the later-described metal structure containing retained austenite and tempered martensite. When the Mn content is less than 1.00%, these effects are not exhibited sufficiently, and thus the Mn content is set to 1.00% or more. The Mn content is preferably greater than 1.50%, more preferably greater than 2.00%, and further preferably greater than 2.50%. On the other hand, when the Mn content exceeds 5.00%, the weldability of the steel sheet decreases, and thus the Mn content is set to 5.00% or less. The Mn content is preferably 4.00% or less, more preferably 3.50% or less, and further preferably 3.00% or less.

[P: 0.100% or Less]

P is an impurity element, and segregates to grain boundaries to make the steel sheet brittle, and thus is an element that is preferable when the content is smaller. When the P content exceeds 0.100%, embrittlement of the steel sheet becomes prominent, and thus the P content is set to 0.100% or less. The P content is preferably less than 0.020%, more preferably less than 0.015%, and further preferably less than 0.010%. The lower limit of the P content includes 0%, but when the P content is reduced to less than 0.0001%, the manufacturing cost increases significantly, and thus 0.0001% of the P content is the practical lower limit in terms of a practical steel sheet.

[S: 0.010% or Less]

S is an impurity element, and forms sulfide-based inclusions in the steel to deteriorate the local ductility of the steel sheet, and thus is an element that is preferable when the content is smaller. When the S content exceeds 0.010%, the deterioration in local ductility of the steel sheet becomes prominent, and thus the S content is set to 0.010% or less. The S content is preferably 0.005% or less and more preferably 0.0012% or less. The lower limit of the S content includes 0%, but when the S content is reduced to less than 0.0001%, the manufacturing cost increases significantly, and thus 0.0001% of the S content is the practical lower limit in terms of a practical steel sheet.

[Sol. Al: 0.001% to 2.500%]

Al is an element that deoxidizes a molten steel. When the sol. Al content is less than 0.001%, the effect is not exhibited sufficiently, and thus the sol. Al content is set to 0.001% or more. The sol. Al content is preferably 0.015% or more, more preferably 0.025% or more, and further preferably 0.045% or more. Further, Al exhibits, similarly to Si, the function of promoting generation of retained austenite, and is an element effective for obtaining the later-described metal structure containing retained austenite and tempered martensite. From this viewpoint, the sol. Al content is preferably set to 0.050% or more. The sol. Al content is more preferably 0.055% or more and further preferably 0.060% or more.

On the other hand, when the sol. Al content is greater than 2.500%, alumina ($Al_2O_3$) in excess amounts is generated and surface flaws resulting from alumina become likely to occur, and thus the sol. Al content is set to 2.500% or less. Further, when the sol. Al content is 0.080% or more, the transformation point greatly rises to make annealing in a temperature zone of greater than the $Ac_3$ point difficult, and thus the sol. Al content is preferably set to less than 0.080%. The sol. Al content is more preferably 0.075% or less, further preferably 0.070% or less, and particularly preferably less than 0.065%.

N: 0.020% or Less

N is an impurity element, and forms nitrides, which cause slab clacking, during continuous casting of the steel, and thus is an element that is preferable when the content is smaller. When the N content exceeds 0.020%, concern for the slab clacking increases, and thus the N content is set to 0.020% or less. The N content is preferably 0.010% or less, more preferably less than 0.008%, and further preferably 0.005% or less. The lower limit of the N content includes 0%, but when the N content is reduced to less than 0.0001%, the manufacturing cost increases significantly, and thus 0.0001% of the N content is the practical lower limit in terms of a practical steel sheet.

Furthermore, besides the above-described elements, elements to be explained below may be contained in order to achieve the improvement in properties.

[Ti: 0% to 0.300%]
[Nb: 0% to 0.300%]
[V: 0% to 0.300%]

Ti, Nb, and V are elements that make the metal structure fine to contribute to the improvements in strength and ductility. However, when the content of these elements exceeds 0.300%, these effects are saturated and the manufacturing cost increases, and thus the content of each of Ti, Nb, and V is set to 0.300% or less.

When Ti, Nb, and V are excessive, a recrystallization temperature at an annealing time rises and the metal structure after the annealing becomes nonuniform, resulting in that there is a risk that the local ductility is impaired. Thus, the Ti content is preferably less than 0.080% or less and more preferably 0.035% or less, the Nb content is preferably less than 0.050% and more preferably 0.030% or less, and the V content is preferably 0.200% or less and more preferably less than 0.100%.

The lower limit of each of Ti, Nb, and V includes 0%, but in order to obtain the effects securely, the content of each of Ti, Nb, and V is preferably 0.001% or more. The Ti content is more preferably 0.005% or more and further preferably 0.010% or more, the Nb content is more preferably 0.005% or more, further preferably 0.010% or more, and particularly preferably 0.015% or more, and the V content is more preferably 0.010% or more and further preferably 0.020% or more. As above, in order to obtain the previously-described effects, one type or two types or more selected from the group consisting of Ti: 0.001% to 0.300%, Nb: 0.001% to 0.300%, and V: 0.001% to 0.300% are preferably contained.

[Cr: 0% to 2.000%]
[Mo: 0% to 2.000%]
[B: 0% to 0.0200%]

Cr, Mo, and B are elements that increase the hardenability of the steel and work effectively for obtaining the later-described metal structure containing retained austenite and tempered martensite.

However, when the Cr content and the Mo content exceed 2.000% and the B content exceeds 0.0200%, the effect is saturated and the manufacturing cost increases. Thus, the Cr content and the Mo content are each set to 2.000% or less, and the B content is set to 0.0200% or less. Preferably, the Cr content is 1.000% or less, the Mo content is 0.500% or less, and the B content is 0.0030% or less.

The lower limit of the Cr, Mo, and B contents includes 0% in each of the elements, but in order to obtain the effect securely, the Cr content and the Mo content are preferably 0.001% or more and the B content is preferably 0.0001% or more. More preferably, the Cr content is 0.100% or more, the Mo content is 0.050% or more, and the B content is 0.0010% or more. As above, in order to obtain the previously-described effect, one type or two types or more selected from the group consisting of Cr: 0.001% to 2.000%, Mo: 0.001% to 2.000%, and B: 0.0001% to 0.0200% are preferably contained.

[Cu: 0% to 2.000%]
[Ni: 0% to 2.000%]

Cu and Ni are elements that contribute to the improvements in yield strength and tensile strength. However, when the Cu content and the Ni content exceed 2.000%, the effect is saturated and the manufacturing cost increases, and thus the Cu content and the Ni content are each set to 2.000% or less. Preferably, the Cu content and the Ni content are each 0.800% or less.

The lower limit of the Cu content and the Ni content includes 0%, but in order to obtain the effect securely, the Cu content and the Ni content are each 0.001% or more preferably. The content of each of the elements is more preferably 0.010% or more. As above, in order to obtain the previously-described effect, one type or two types selected from the group consisting of Cu: 0.001% to 2.000% and Ni: 0.001% to 2.000% are preferably contained.

[Ca: 0% to 0.0100%]
[Mg: 0% to 0.0100%]
[REM: 0% to 0.1000%]

Ca, Mg, and REM are elements that adjust shapes of inclusions to contribute to the improvement in local ductility.

However, when the Ca content and the Mg content exceed 0.0100% and the REM content exceeds 0.1000%, the effect is saturated and the manufacturing cost increases. Thus, the Ca content and the Mg content are each set to 0.0100% or less and the REM content is set to 0.1000% or less. Preferably, the Ca content and the Mg content are 0.0020% or less and the REM content is 0.0100% or less.

The lower limit of each of the CA, Mg, and REM contents includes 0%, but in order to obtain the effect securely, the Ca, Mg, and REM contents are each preferably 0.0001% or more. More preferably, the content of each of the elements is also 0.0005% or more. As above, in order to obtain the previously-described effect, one type or two types or more selected from the group consisting of Ca: 0.0001% to 0.0100%, Mg: 0.0001% to 0.0100%, and REM: 0.0001% to 0.1000% are preferably contained.

Here, REM is a generic term for 17 types of elements as a total of Sc, Y, and lanthanoid. Lanthanoid is industrially added as a form of misch metal. Incidentally, in the present invention, the REM content indicates the total content of these elements.

[Bi: 0% to 0.0500%]

Bi is an element that makes a solidification structure fine and contributes to the improvement in local ductility. However, when the Bi content exceeds 0.0500%, the effect is saturated and the manufacturing cost increases, and thus the Bi content is set to 0.0500% or less. The Bi content is preferably 0.0100% or less and more preferably 0.0050% or less. The lower limit of the Bi content includes 0%, but in order to obtain the effect securely, the Bi content is preferably 0.0001% or more. The Bi content is more preferably 0.0003% or more. As above, in order to obtain the previously-described effect, Bi: 0.0001% to 0.0500% is preferably contained.

A balance of the chemical composition of the hot-dip galvanized steel sheet, the alloyed galvannealed steel sheet, and the material steel sheet to be used for their manufacturing methods according to this embodiment is iron and impurities. The impurities are elements mixed in steel raw materials such as ore or scrap or elements to be mixed due to various reasons in manufacturing steps when manufacturing a steel product industrially. These elements are allowed to be contained within a range not impairing the properties of the present invention.

(B) Metal Structure

Next, there will be explained a metal structure of the hot-dip galvanized steel sheet and the alloyed galvannealed steel sheet in this embodiment. The metal structure of the hot-dip galvanized steel sheet and the alloyed galvannealed steel sheet in this embodiment is characterized in that it contains, in volume %, greater than 5.0% of retained austenite and greater than 5.0% of tempered martensite, and further the C content in the retained austenite is 0.85 mass % or more, in order to improve the uniform ductility and the local ductility while maintaining the yield strength and the tensile strength. Then, preferably, it is characterized in that the metal structure further contains greater than 2.0% of polygonal ferrite and the Mn content in the retained austenite satisfies Expression (1) below. Incidentally, the C content in the retained austenite means the C concentration in an austenite phase, and the Mn content in the retained austenite means the Mn concentration in the austenite phase.

$$[Mn]_\gamma/[Mn]_{ave} \geq 1.10 \quad (1)$$

$[Mn]_\gamma$: Mn content in retained austenite (mass %)
$[Mn]_{ave}$: Mn content of the chemical composition of the steel sheet (mass %)

Hereinafter, there will be explained structure requirements in order.

[Retained Austenite: Greater than 5.0 Vol %]

In order to improve the uniform ductility, the volume fraction of the retained austenite is set to greater than 5.0%. The volume fraction of the retained austenite is preferably greater than 6.0%, more preferably greater than 8.0%, and further preferably greater than 10.0%.

However, when the retained austenite exists excessively, the local ductility deteriorates, and thus the volume fraction of the retained austenite is preferably less than 30.0%. The volume fraction of the retained austenite is more preferably less than 20.0% and further preferably less than 15.0%.

[Tempered Martensite: Greater than 5.0 Vol %]

In order to improve the local ductility while maintaining the yield strength and the tensile strength, the volume fraction of the tempered martensite is set to greater than 5.0%. The volume fraction of the tempered martensite is preferably greater than 16.0%, and the volume fraction of the tempered martensite is more preferably greater than 30.0%, further preferably greater than 40.0%, and particularly preferably greater than 50.0%.

However, when the tempered martensite exists excessively, the uniform ductility deteriorates, and thus the volume fraction of the tempered martensite is preferably 70.0% or less. The volume fraction of the tempered martensite is more preferably 60.0% or less.

[Polygonal Ferrite: Greater than 2.0 Vol %]

In order to further improve the uniform ductility, the volume fraction of the polygonal ferrite is preferably set to greater than 2.0%. The volume fraction of the polygonal ferrite is more preferably greater than 6.0%, further preferably greater than 8.0%, and particularly preferably greater than 13.0%.

However, when the polygonal ferrite exists excessively, the yield strength and the tensile strength decrease, and the local ductility also further decreases, and thus the volume fraction of the polygonal ferrite is preferably less than 35.0%. The volume fraction of the polygonal ferrite is more preferably less than 30.0%, further preferably less than 25.0%, and particularly preferably less than 20.0%.

[C Content in Retained Austenite: 0.85 Mass % or More]

In the retained austenite of the metal structure of the hot-dip galvanized steel sheet and the alloyed galvannealed steel sheet in this embodiment, the C content in the retained austenite is set to 0.85 mass % or more in order to stabilize the retained austenite and improve the uniform ductility and the local ductility.

In order to further improve the uniform ductility, the C content in the retained austenite is preferably 0.87 mass % or more and more preferably 0.89 mass % or more. On the other hand, when the C content in the retained austenite is too large, the TRIP effect cannot be obtained and the uniform ductility deteriorates, and thus the C content in the retained austenite is preferably less than 1.50 mass %. The C content in the retained austenite is more preferably less than 1.20 mass % and further preferably less than 1.10 mass %.

[Mn Content in Retained Austenite: Expression (1) Below]

$$[Mn]_\gamma/[Mn]_{ave} \geq 1.10 \quad (1)$$

$[Mn]_\gamma$: Mn content in retained austenite (mass %)
$[Mn]_{ave}$: Mn content of the chemical composition of the steel sheet (mass %)

Expression (1) above is the expression defining the relationship between $[Mn]_\gamma$ and $[Mn]_{ave}$. In the retained austenite of the hot-dip galvanized steel sheet and the alloyed galvannealed steel sheet in this embodiment, a required amount of Mn is preferably concentrated. Mn also effectively functions for stabilizing the retained austenite and improving the uniform ductility and the local ductility, similarly to C.

In order to utilize the function at the maximum, $[Mn]_\gamma/[Mn]_{ave}$ is preferably set to 1.10 or more and further preferably 1.15 or more. The upper limit of $[Mn]_\gamma/[Mn]_{ave}$ is not limited in particular, but is 2.00 practically. From the viewpoint of productivity, $[Mn]_\gamma/[Mn]_{ave}$ is preferably 1.35 or less and more preferably 1.25 or less.

[Martensite]

In the hot-dip galvanized steel sheet and the alloyed galvannealed steel sheet in this embodiment, in order to further improve the local ductility while maintaining the yield strength, the content of the martensite is suppressed as much as possible. Here, the martensite indicates martensite that is not tempered, namely fresh martensite. The volume fraction of the martensite is preferably less than 5.0%. The volume fraction of the martensite is more preferably less than 2.0% and further preferably less than 1.0%.

[Balance Structure]

The balance structure of the metal structure is a low-temperature transformation structure such as acicular ferrite and bainite, may contain pearlite, and may contain precipitates such as cementite. The balance structure does not need to contain low-temperature transformation products, pearlite, and precipitates, and thus the lower limit of the volume fraction of each of the low-temperature transformation products, the pearlite, and the precipitates is 0 vol %.

The upper limit of the volume fraction of each of the low-temperature transformation products, the pearlite, and the precipitates is not limited in particular. However, when the low-temperature transformation products, the pearlite, and the precipitates exist excessively, the yield strength and the tensile strength decrease, and thus the total of the volume fractions of the low-temperature transformation products, the pearlite, and the precipitates is preferably 40.0% or less. The total of the volume fractions of these structures is more preferably 20.0% or less and further preferably 10.0% or less.

When the pearlite exists excessively, the yield strength and the tensile strength decrease and further the uniform ductility also decreases, and thus the volume fraction of the pearlite is preferably less than 10.0%. The volume fraction of the pearlite is more preferably less than 5.0% or less and further preferably less than 3.0%.

The metal structure of the hot-dip galvanized steel sheet and the alloyed galvannealed steel sheet according to this embodiment is measured as follows. A test piece is collected from an arbitrary position of the steel sheet, a longitudinal section parallel to a rolling direction is polished, and the metal structure at a depth positioned at ¼ of the sheet thickness of the steel sheet being a base material from the boundary between the steel sheet being a base material and a plating layer is observed by using a scanning electron microscope (SEM) to be subjected to image processing, and to thereby measure an area ratio of each structure. The area ratio is set to be equivalent to the volume fraction, and the measured area ratio is set as the volume fraction.

The tempered martensite can be distinguished from the bainite by the point that iron carbides existing inside the structure are expanded in a plurality of directions. The polygonal ferrite can be distinguished from the acicular ferrite by the point that it exhibits a massive form and the point that a dislocation density is low.

The volume fraction of the retained austenite and the C content in the retained austenite are found in a manner that a test piece is collected from an arbitrary position of the steel sheet and a rolled surface is chemically polished to a depth positioned at ¼ of the sheet thickness of the steel sheet being a base material from the boundary between the steel sheet being a base material and the plating layer to measure an X-ray diffraction intensity and a diffraction peak position by using an X-ray diffractometer (XRD).

The Mn content in the retained austenite ($[Mn]_\gamma$) is measured as follows. A test piece is collected from an arbitrary position of the steel sheet and the metal structure at a depth positioned at ¼ of the sheet thickness of the steel sheet being a base material from the boundary between the steel sheet being a base material and the plating layer is observed by using a SEM equipped with an electron backscatter diffraction pattern analyzer (EBSP) to confirm retained austenite grains.

Subsequently, the Mn concentration of the above-described retained austenite grains is measured by using a SEM equipped with an electron probe microanalyzer (EPMA). The measurement by the EMPA is performed on 10 or more retained austenite grains and the average value of obtained Mn contents is set to $[Mn]_\gamma$.

In the measurement by the EPMA, an electron beam with a beam diameter smaller than the grain diameter of the retained austenite is emitted to the retained austenite grain, and thus it is preferred to use a SEM equipped with a field-emission electron probe microanalyzer (FE-EPMA).

The hot-dip galvanizing layer and the alloyed galvannealing layer may be a plating layer and an alloyed plating layer that are formed under the normal plating conditions. However, when the Fe concentration of the alloyed galvannealing layer is less than 7 mass %, weldability and slidability sometimes become insufficient, and thus the Fe concentration of the alloyed galvannealing layer is preferably 7 mass % or more.

The upper limit of the Fe concentration of the alloyed galvannealing layer is preferably 20 mass % or less and more preferably 15 mass % or less from the viewpoint of powdering resistance. The Fe content of the plating layer can be adjusted by controlling a treatment condition in the galvannealing after the hot-dip galvanizing.

(C) Mechanical Properties

The mechanical properties of the hot-dip galvanized steel sheet and the alloyed galvannealed steel sheet according to this embodiment are not limited to specific mechanical properties, in particular.

However, uniform elongation in a direction perpendicular to the rolling direction is defined as UEl (Uniform Elongation). Then, as for total elongation in a direction perpendicular to the rolling direction ($TEl_0$), the value converted into the total elongation equivalent to the case of the sheet thickness being 1.2 mm based on Expression (2) below is defined as TEl (Total Elongation). Further, local elongation in a direction perpendicular to the rolling direction that is converted equivalently to the case of the sheet thickness being 1.2 mm based on Expression (3) below is defined as LEl (Local Elongation). In the hot-dip galvanized steel sheet and the alloyed galvannealed steel sheet according to this embodiment, from the viewpoint of press formability, the value of TS×UEl is preferred to be 10000 MPa·% or more and the value of TS×LEl is preferred to be 5000 MPa·% or more.

When the tensile strength and the uniform elongation are both excellent, the value of TS×UEl increases to thus be used as an index to evaluate the uniform ductility. When the tensile strength and the local elongation are both excellent, the value of TS×LEl increases to thus be used as an index to evaluate the local ductility.

It is more preferred that the value of TS×UEl should be 11000 MPa % or more and the value of TS×LEl should be 6000 MPa % or more. It is further preferred that the value of TS×UEl should be 12000 MPa % or more and the value of TS×LEl should be 7000 MPa % or more.

$$TEl = TEl_0 \times (1.2/t_0)^{0.2} \quad (2)$$

$$LEl = TEl - UEl. \quad (3)$$

Here, $TEl_0$ in Expression (2) is the actual measured value of the total elongation measured by using a JIS No. 5 tensile test piece, and $t_0$ is the sheet thickness of the JIS No. 5 tensile test piece used for the measurement. Further, TEl and LEl are a corresponding value of the total elongation and a corresponding value of the local elongation that are equivalent to the case of the sheet thickness being 1.2 mm respectively. UEl is the actual measured value of the uniform elongation measured by using a JIS No. 5 tensile test piece.

In order to improve the impact absorbability of the steel sheet, the tensile strength (TS) of the steel sheet is preferably 780 MPa or more. The tensile strength (TS) of the steel sheet is more preferably 980 MPa or more and further preferably 1180 MPa or more. A yield ratio (YR) of the steel sheet is preferably 0.59 or more. The yield ratio (YR) of the steel sheet is more preferably 0.66 or more and further preferably 0.72 or more.

As the local ductility is higher, cracking when an impact load is loaded is suppressed and adsorbed energy increases, and thus the value of TS×LEl is preferably 5500 MPa·% or more from the viewpoint of suppressing cracking. The value of TS×LEl is more preferably 6500 MPa·% or more.

(D) Manufacturing Method

Next, there will be explained the manufacturing method of the hot-dip galvanized steel sheet and the manufacturing method of the alloyed galvannealed steel sheet in this embodiment.

The manufacturing method of the hot-dip galvanized steel sheet according to this embodiment includes: a step of performing annealing by heating, to greater than $Ac_1$ point, an original material steel sheet having the previously-described chemical composition; a step of performing first cooling, wherein the annealed material steel sheet is cooled at an average cooling rate of 2° C./second or more and less than 100° C./second in a temperature zone of 650° C. to 500° C. and further cooled down to 500° C. or less after the step of performing the annealing; a step of performing hot-dip galvanizing on the first cooled material steel sheet after the step of performing the first cooling; a step of performing second cooling, wherein the hot-dip galvanized material steel sheet is cooled from a plating temperature in the step of performing hot-dip galvanizing to 300° C. at an average cooling rate of 2° C./second or more and further cooled down to 300° C. or less after the step of performing the hot-dip galvanizing; a step of performing temper rolling on the secondary cooled material steel sheet at an elongation percentage of 0.10% or more after the step of performing the second cooling; and a step of performing a heat treatment, wherein the temper rolled material steel sheet is heated to a temperature between 200° C. and 600° C. and retained for 1 second or more after the step of performing the temper rolling.

Among them, a preferable manufacturing method of the manufacturing method of the hot-dip galvanized steel sheet according to this embodiment includes: as illustrated in FIG. 1, a step of performing annealing by heating, to greater than $Ac_3$ point, an original material steel sheet having the previously-described chemical composition; a step of performing first cooling, wherein the annealed material steel sheet is cooled at an average cooling rate of 7° C./second or less in a temperature zone of the heating temperature to the heating temperature minus 50° C. and further cooled at an average cooling rate of 2° C./second or more and less than 100° C./second in a temperature zone of 650° C. to 500° C. and further cooled down to 500° C. or less after the step of performing the annealing; a step of performing hot-dip galvanizing on the first cooled material steel sheet after the step of performing the first cooling; a step of performing second cooling, wherein the hot-dip galvanized material steel sheet is cooled from a plating temperature in the step of performing hot-dip galvanizing to 300° C. at an average cooling rate of 2° C./second or more and further cooled down to 300° C. or less after the step of performing the hot-dip galvanizing; a step of performing temper rolling on the secondary cooled material steel sheet at an elongation percentage of 0.10% or more after the step of performing the second cooling; and a step of performing a heat treatment, wherein the temper rolled material steel sheet is heated to a temperature between 200° C. and 600° C. and retained for 1 second or more after the step of performing the temper rolling.

The manufacturing method of the alloyed galvannealed steel sheet in this embodiment includes: a step of performing annealing by heating, to greater than $Ac_1$ point, an original material steel sheet having the previously-described chemical composition; a step of performing first cooling, wherein the annealed material steel sheet is cooled at an average cooling rate of 2° C./second or more and less than 100° C./second in a temperature zone of 650° C. to 500° C. and further cooled down to 500° C. or less after the step of performing the annealing; a step of performing hot-dip galvanizing on the first cooled material steel sheet after the step of performing the first cooling; a step of performing galvannealing the hot-dip galvanized material steel sheet at galvannealing temperature after the step of performing the hot-dip galvanizing; a step of performing second cooling, wherein the alloyed galvannealed material steel sheet is cooled from the galvannealing temperature to 300° C. at an average cooling rate of 2° C./second or more and further cooled down to 300° C. or less after the step of performing the galvannealing; a step of performing temper rolling on the secondary cooled material steel sheet at an elongation percentage of 0.10% or more after the step of performing the second cooling; and a step of performing a heat treatment, wherein the temper rolled material steel sheet is heated to a temperature between 200° C. and 600° C. and retained for 1 second or more after the step of performing the temper rolling.

Among them, a preferable manufacturing method of the manufacturing method of the alloyed galvannealed steel sheet in this embodiment includes: as illustrated in FIG. 2, a step of performing annealing by heating, to greater than $Ac_3$ point, an original material steel sheet having the previously-described chemical composition; a step of performing first cooling, wherein the annealed material steel sheet is cooled at an average cooling rate of 7° C./second or less in a temperature zone of the heating temperature to the heating temperature minus 50° C. and further cooled at an average cooling rate of 2° C./second or more and less than 100° C./second in a temperature zone of 650° C. to 500° C. and further cooled down to 500° C. or less after the step of performing the annealing; a step of performing hot-dip galvanizing on the first cooled material steel sheet after the step of performing the first cooling; a step of performing galvannealing the hot-dip galvanized material steel sheet at galvannealing temperature after the step of performing the hot-dip galvanizing; a step of performing second cooling, wherein the alloyed galvannealed material steel sheet is cooled from the galvannealing temperature to 300° C. at an average cooling rate of 2° C./second or more and further cooled down to 300° C. or less after the step of performing the galvannealing; a step of performing temper rolling on the secondary cooled material steel sheet at an elongation percentage of 0.10% or more after the step of performing the second cooling; and a step of performing a heat treatment, wherein the temper rolled material steel sheet is heated to a temperature between 200° C. and 600° C. and retained for 1 second or more after the step of performing the temper rolling.

The manufacturing method of the material steel sheet to be used for the manufacturing method of the hot-dip galvanized steel sheet and the manufacturing method of the alloyed galvannealed steel sheet in this embodiment is not limited to a specific manufacturing method. For example, a slab having the previously-described chemical composition is manufactured by casting and is heated to a temperature zone of less than 1250° C., and after the heating, is subjected to hot rolling at a finish rolling temperature that is the $Ar_3$ point or more and greater than 850° C. Then, coiling is performed at a coiling temperature of 500° C. or more and less than 700° C., cold rolling is performed at a reduction ratio of 40% or more and less than 70%, and then the material steel sheet is manufactured.

A casting method of the slab is not limited to a specific casting method, but a continuous casting method is preferred. However, a steel ingot cast by another casting method may be subjected to bloom rolling or the like, to thereby manufacture a steel billet. In a continuous casting step, a molten steel is preferably made to flow by electromagnetic mixing or the like in a mold in order to suppress occurrence of surface defects caused by inclusions. After being cooled once, the steel ingot in a high-temperature state after the continuous casting or the steel billet in a high-temperature state after the bloom rolling may be reheated to be subjected to hot rolling.

Further, the steel ingot in a high-temperature state after the continuous casting or the steel billet in a high-temperature state after the bloom rolling may be subjected to hot rolling directly without being reheated or may be subjected to hot rolling after being heated subsidiarily. Incidentally, the steel ingot and the steel billet that are subjected to hot rolling are generically referred to as a "slab."

The temperature of the slab to be subjected to hot rolling is preferably less than 1250° C. in order to prevent coarsening of austenite. The slab temperature is more preferably 1200° C. or less. The lower limit of the temperature of the slab to be subjected to hot rolling is not limited in particular, but the temperature is preferred to be a temperature at which the hot rolling can be completed at the $Ar_3$ point or more.

The condition of the hot rolling is not limited in particular, but when the completion temperature of the hot rolling is too low, there is a risk that in the metal structure of a hot-rolled steel sheet, a coarse low-temperature transformation structure elongated in the rolling direction is generated to interfere with the uniform ductility and the local ductility, and thus the completion temperature of the hot rolling is preferably the $Ar_3$ point or more and greater than 850° C. The completion temperature of the hot rolling is more preferably the $Ar_3$ point or more and greater than 880° C. and further preferably the $Ar_3$ point or more and greater than 900° C. The upper limit of the completion temperature of the hot rolling is not limited in particular, but is preferably 1000° C. or less from the point of making grains in the metal structure of the hot-rolled steel sheet fine.

Incidentally, in the case where the hot rolling is composed of rough rolling and finish rolling, the finish rolling is completed within the above-described temperature range, and thus a rough rolled material may be heated between the rough rolling and the finish rolling. On this occasion, the rough rolled material is heated so as to make the temperature of a rear end of the rough rolled material higher than that of a leading end of the rough rolled material, and the variation in temperature over the entire length of the rough rolled material at the time when the finish rolling starts is suppressed to 140° C. or less preferably. By this temperature suppression, uniformity of properties in a coil made by coiling the hot-rolled steel sheet improves.

The heating of the rough rolled material may be performed by using a well-known means. For example, between a roughing mill and a finishing mill, a solenoid induction heating apparatus may be provided and a temperature increased amount by heating by the solenoid induction heating apparatus may be controlled based on a temperature distribution in the longitudinal direction of the rough rolled material on the upstream side of this induction heating apparatus or the like.

The condition between finish of the hot rolling and start of coiling is not limited in particular, but in order to increase a cold-rolling property of the hot-rolled steel sheet by softening the hot-rolled steel sheet, the coiling temperature (temperature when coiling starts) is preferably set to 600° C. or more. The coiling temperature is more preferably 640° C. or more and further preferably 680° C. or more. When the coiling temperature is too high, picklability of the hot-rolled steel sheet is sometimes impaired, and thus the coiling temperature is preferably 750° C. or less and more preferably less than 720° C. After the coiling, in a temperature zone of the coiling temperature to the coiling temperature minus 50° C., the hot-rolled steel sheet is preferably cooled at an average cooling rate of greater than 15° C./hour. Thereby, the productivity increases, and at the same time, melting of carbides is promoted in the later-described annealing step.

The hot-rolled steel sheet is cold rolled according to an ordinary method to obtain a cold-rolled steel sheet. Before the cold rolling, descaling may be performed by pickling or the like. A reduction ratio of the cold rolling is preferably set to 40% or more in order to promote recrystallization to then uniformize a metal structure obtained after the cold rolling and annealing and further improve the local ductility. When the reduction ratio is too high, a rolling load sometimes increases to make the rolling difficult, and thus the reduction ratio is preferably less than 70% and more preferably less than 60%.

Next, there will be explained step conditions in the manufacturing method of the hot-dip galvanized steel sheet and the manufacturing method of the alloyed galvannealed steel sheet in this embodiment.

[Step of Performing Annealing]

(Heating Temperature: Greater than the $Ac_1$ Point)

In the step of annealing the material steel sheet, the material steel sheet is heated. The heating temperature is set to greater than the $Ac_1$ point in order to generate austenite at the time of heating. The $Ac_1$ point is the temperature at which austenite starts to be generated in the metal structure when the material steel sheet is heated. The material steel sheet is preferably heated to greater than the $Ac_3$ point to be annealed in order to improve the local ductility of the hot-dip galvanized steel sheet and the alloyed galvannealed steel sheet by uniformizing the metal structure. The $Ac_3$ point is the temperature at which ferrite disappears in the metal structure when the material steel sheet is heated.

The material steel sheet is heated to the above-described temperature range, namely to an austenite region, and thereby carbide melts and in the metal structure of the hot-dip galvanized steel sheet and the alloyed galvannealed steel sheet, the content of the retained austenite and the C content in the retained austenite increase.

The upper limit of the heating temperature is not limited in particular, but when the heating temperature is too high, the austenite becomes coarse and the local ductility is impaired, and thus the heating temperature is preferably the $Ac_3$ point plus 100° C. or less and more preferably the $Ac_3$ point plus 50° C. or less. A retention time at the heating temperature is not limited in particular despite the heating temperature, but in order to uniformize the metal structure in a coil, the retention time is preferably 10 seconds or more, and from the point of suppressing the coarsening of austenite, the retention time is preferably within 240 seconds.

[Step of Performing First Cooling]

(Average Cooling Rate in a Temperature Zone of the Heating Temperature to the Heating Temperature Minus 50° C.: 7° C./Second or Less)

In the case where the material steel sheet is heated to greater than the $Ac_3$ point to be annealed, in the step of performing the first cooling, the average cooling rate in the temperature zone of the heating temperature to the heating temperature minus 50° C. is preferably set to 7° C./second or less. By this cooling, in the metal structure of the hot-dip galvanized steel sheet and the alloyed galvannealed steel sheet, the Mn content in the retained austenite increases, and at the same time, polygonal ferrite is generated and the uniform ductility and the local ductility improve.

When the average cooling rate in the temperature zone of the heating temperature to the heating temperature minus 50° C. exceeds 7° C./second, the Mn content in the retained austenite decreases, and at the same time, the content of the polygonal ferrite decreases and the uniform ductility and the local ductility are impaired. Thus, the average cooling rate in the above-described temperature zone is preferably set to 7° C./second or less. More preferably, the average cooling rate in the above-described temperature zone is 5° C./second or less. The lower limit of the average cooling rate is not defined in particular, but is preferably 1° C./second or more from the viewpoint of productivity.

Further, when the temperature zone where the cooling at the average cooling rate of 7° C./second or less is performed is wider, the Mn content in the retained austenite increases, and at the same time, the content of the polygonal ferrite increases. Therefore, in a temperature zone of the heating temperature to the heating temperature minus 100° C., the material steel sheet is preferably cooled at the average cooling rate of 7° C./second or less, and in a temperature zone of the heating temperature to the heating temperature minus 150° C., the material steel sheet is more preferably cooled at the average cooling rate of 7° C./second or less.

(Average Cooling Rate in a Temperature Zone of 650° C. to 500° C.: 2° C./Second or More and Less than 100° C./Second)

In the step of performing the first cooling, the average cooling rate in the temperature zone of 650° C. to 500° C. is set to 2° C./second or more and less than 100° C./second, and the material steel sheet is cooled down to 500° C. or less without performing isothermal holding in the middle.

When the average cooling rate in the temperature zone of 650° C. to 500° C. is less than 2° C./second, polygonal ferrite and pearlite are generated excessively and the yield strength and the tensile strength decrease. Thus, the average cooling rate in the above-described temperature zone is set to 2° C./second or more. The average cooling rate in the above-described temperature zone is preferably 3° C./second or more, more preferably 4° C./second or more, and further preferably 5° C./second or more.

On the other hand, when the average cooling rate in the temperature zone of 650° C. to 500° C. is 100° C./second or more, the shape of the steel sheet is impaired, and thus the average cooling rate in the above-described temperature zone is set to less than 100° C./second. The average cooling rate in the above-described temperature zone is preferably 50° C./second or less, more preferably 30° C./second or less, and further preferably 20° C./second.

(Cooling Stop Temperature: 500° C. or Less)

The material steel sheet cooled at a required average cooling rate is cooled down to 500° C. or less continuously. The cooling condition in the temperature zone of 500° C. or less is not limited in particular, but the material steel sheet is preferably retained for four seconds to 45 seconds in a temperature zone of 500° C. or less and 460° C. or more. It is more preferably retained for 10 seconds to 35 seconds. By this retention, in the metal structure to be formed in the later-described step of performing the second cooling, the volume fraction of the retained austenite and the C content in the retained austenite are adjusted moderately, the uniform ductility and the local ductility improve, and further, the yield strength also increases.

[Step of Performing Hot-Dip Galvanizing]

After the step of performing the first cooling, hot-dip galvanizing is performed on the material steel sheet. Between the step of performing the first cooling and the step of performing the hot-dip galvanizing, at least one of cooling and heating may be performed on the material steel sheet as necessary.

A bath temperature and a bath composition of the hot-dip galvanizing may be general ones and are not limited in particular. A plating deposition amount is also not limited in particular and may be within a normal range. For example, a deposition amount of 20 g/m² to 80 g/m² per one side of the material steel sheet is preferable. A plating temperature is not limited in particular, but is 460° C. to 470° C. normally.

[Step of Performing a Galvannealing]

In the case of manufacturing the alloyed galvannealed steel sheet, after the step of performing the hot-dip galvanizing, the material steel sheet on which the hot-dip galvanizing has been performed is heated to a temperature necessary for the hot-dip galvanizing to be alloyed (galvannealing temperature) to be subjected to a galvannealing.

The galvannealing is preferably performed under a condition such that the Fe concentration in the plating layer becomes 7 mass % or more. The galvannealing is preferably performed under the condition that the galvannealing temperature is 470° C. to 560° C. and the galvannealing time is 5 seconds to 60 seconds, for example.

[Step of Performing Second Cooling]

(Average Cooling Rate in a Temperature Zone of the Plating Temperature or Galvannealing Temperature to 300° C.: 2° C./Second or More)

(Cooling Stop Temperature: 300° C. or Less)

After the step of performing the hot-dip galvanizing, or in cooling after the step of performing the galvannealing, cooling is performed down to 300° C. or less at an average cooling rate in a temperature zone of the plating temperature to 300° C. or in a temperature zone of the galvannealing temperature to 300° C. set to 2° C./second or more.

When the average cooling rate in the step of performing the second cooling is less than 2° C./second, pearlite is generated excessively and the yield strength and the tensile strength decrease, and the content of the retained austenite decreases and the uniform ductility is impaired. Thus, the average cooling rate in the above-described temperature zone is set to 2° C./second or more. The average cooling rate in the above-described temperature zone is preferably 3° C./second or more, more preferably greater than 5° C./second, and further preferably greater than 10° C./second.

The upper limit of the average cooling rate in the step of performing the second cooling is not limited in particular, but is preferably 500° C./second or less from the viewpoint of economic efficiency. Further, the cooling stop temperature is preferably room temperature for the purpose of efficiently performing the later-described temper rolling.

The material steel sheet obtained after the step of performing the second cooling preferably has a metal structure that contains 5.0% or more and 35.0% or less in volume fraction of retained austenite and in which the C content in the retained austenite is less than 0.85 mass %. Thereby, in the later-described step of performing the heat treatment, the C concentration and the Mn concentration to retained austenite are promoted, the uniform ductility and the local ductility improve, and the yield strength also increases.

The volume fraction of the retained austenite is more preferably 10.0% or more and 30.0% or less and further preferably 15.0% or more and 25.0% or less. The C content in the retained austenite is more preferably less than 0.80 mass %, further preferably less than 0.75 mass %, and particularly preferably less than 0.70 mass %. The lower limit of the C content in the retained austenite is not limited in particular, but about 0.50 mass % becomes the practical lower limit value.

[Step of Performing Temper Rolling]
(Elongation Percentage: 0.10% or More)

After the step of performing the second cooling, temper rolling at an elongation percentage of 0.10% or more is performed on the material steel sheet. By this temper rolling, in the later-described heat treatment step, the C concentration and the Mn concentration to austenite are promoted, and in the metal structure of the hot-dip galvanized steel sheet and the alloyed galvannealed steel sheet, the C content and the Mn content in the retained austenite increase, the uniform ductility and the local ductility improve, and the yield strength also increases.

When the elongation percentage is less than 0.10%, the above-described effect in the following step of performing the heat treatment cannot be obtained, and thus the elongation percentage is set to 0.10% or more. The elongation percentage is preferably 0.30% or more and more preferably 0.50% or more. The upper limit of the elongation percentage is not limited in particular, but when the elongation percentage is too high, a rolling load increases, and thus the elongation percentage is preferably 2.00% or less. The elongation percentage is more preferably less than 1.50% and further preferably less than 1.00%.

The temperature at which the temper rolling is performed is not limited in particular, but in order to efficiently provide working strain to austenite, the temperature at which the temper rolling is performed is preferably a low temperature and a starting temperature of the temper rolling is preferably room temperature. Further, the temper rolling is preferably performed by skin pass rolling.

[Step of Performing a Heat Treatment]
(Heating Temperature: 200° C. to 600° C.)
(Retention Time: One Second or More)

After the step of performing the temper rolling, the material steel sheet is heated to a temperature zone of 200° C. to 600° C. and is retained at the temperature for one second or more.

When the heat treatment temperature (maximum heating temperature) is less than 200° C., the C concentration and the Mn concentration to austenite become insufficient and the uniform ductility is impaired. Further, when the heat treatment temperature (maximum heating temperature) is less than 200° C., hard martensite remains, the local ductility is impaired, and at the same time, the yield strength decreases. Thus, the heat treatment temperature is set to 200° C. or more. The heat treatment temperature is preferably 240° C. or more, more preferably 260° C. or more, and further preferably 280° C. or more.

On the other hand, when the heat treatment temperature exceeds 600° C., the content of the retained austenite becomes short and the uniform ductility is impaired, and the tempered martensite softens excessively and the yield strength and the tensile strength decrease. Further, when the heat treatment temperature exceeds 600° C., hard fresh martensite is generated, the local ductility is impaired, and at the same time, the yield strength decreases. Thus, the heat treatment temperature is set to 600° C. or less. The heat treatment temperature is preferably 550° C. or less, more preferably 500° C. or less, and further preferably 450° C. or less.

When the heat treatment time (retention time at the maximum heating temperature) is less than one second, the C concentration and the Mn concentration to austenite become insufficient and the uniform ductility is impaired. Further, when the heat treatment time is less than one second, hard martensite remains, the local ductility is impaired, and at the same time, the yield strength decreases. Thus, the heat treatment time is set to one second or more. The heat treatment time is preferably greater than five seconds, more preferably greater than 10 seconds, and further preferably greater than 15 seconds.

On the other hand, when the heat treatment time is too long, the content of the retained austenite decreases and the uniform ductility is impaired, and further, the tempered martensite softens excessively and the yield strength and the tensile strength decrease. Further, when the heat treatment time is too long, hard fresh martensite is generated, the local ductility is impaired, and at the same time, the yield strength decreases. Thus, the upper limit of the heat treatment time is preferably 5760 minutes or less. The heat treatment time is more preferably 2880 minutes or less, and further preferably 1440 minutes or less.

The heat treatment time is preferably adjusted appropriately according to the heat treatment temperature. In the case where the heat treatment temperature is 200° C. or more and 300° C. or less, for example, the heat treatment time is preferably greater than three minutes, more preferably greater than 10 minutes, and further preferably greater than 20 minutes.

In the case where the heat treatment temperature is 400° C. or more and 600° C. or less, the heat treatment time is preferably 20 minutes or less, more preferably six minutes or less, and further preferably less than three minutes. From the viewpoint of productivity, the heat treatment temperature is greater than 400° C. and the heat treatment time is 20 minutes or less preferably.

After the step of performing the heat treatment, in order to correct the material steel sheet smooth, temper rolling may be performed on the material steel sheet, and further applying oil may be performed or a coating film having a lubrication action may be formed on the material steel sheet.

The sheet thickness of the hot-dip galvanized steel sheet and the alloyed galvannealed steel sheet according to this embodiment is not limited to a specific sheet thickness, but the manufacturing methods of the hot-dip galvanized steel sheet and the alloyed galvannealed steel sheet in this embodiment are suitable for the manufacture of a steel sheet having a sheet thickness of 0.8 mm to 2.3 mm.

EXAMPLE

Next, examples of the present invention will be explained, but conditions of the examples are condition examples employed for confirming the applicability and effects of the present invention, and the present invention is not limited to these condition examples. The present invention can employ various conditions as long as the object of the present invention is achieved without departing from the spirit of the present invention.

Example 1

Molten steels having chemical compositions illustrated in Table 1 were cast by using a vacuum melting furnace to manufacture steels A to S. The $Ac_1$ point and the $Ac_3$ point in Table 1 were found by thermal expansion changes that occurred when cold-rolled steel sheets of the steels A to S were heated at 2° C./second. The steels A to S were heated to 1200° C. and were retained for 60 minutes, and then were subjected to hot rolling under conditions illustrated in Table 2.

Concretely, in a temperature zone of the $Ac_3$ point or more, 10-pass rolling was performed on the steels A to S, and thereby hot-rolled steel sheets each having a thickness of 2.5 mm to 3.0 mm were obtained. After the hot rolling, the hot-rolled steel sheets were cooled down to 550° C. to 680° C. by a water spray, a cooling finishing temperature was set as the coiling temperature, and the hot-rolled steel sheets were charged into an electric heating furnace kept at this coiling temperature to be retained for 60 minutes. Thereafter, the hot-rolled steel sheets were cooled down to room temperature in the furnace at a cooling rate of 20° C./hour and slow cooling after coiling was simulated.

The slow-cooled hot-rolled steel sheets were pickled to be set as base materials for cold rolling, and were subjected to cold rolling at a reduction ratio of 47 to 52% to obtain cold-rolled steel sheets each having a thickness of 1.2 mm to 1.6 mm (material steel sheets). By using a hot-dip galvanizing simulator, the material steel sheets were heated up to 650° C. at a heating rate of 10° C./second and then were heated up to temperatures illustrated in Table 2 at a heating rate of 2° C./second to be subjected to soaking for 30 to 90 seconds.

Thereafter, the material steel sheets were cooled down to 460° C. under cooling conditions illustrated in Table 2, the material steel sheets were immersed in a hot-dip galvanizing bath kept at 460° C., and hot-dip galvanizing was performed on the material steel sheets. Some of the material steel sheets were heated up to 520° C. after the hot-dip galvanizing and were subjected to a galvannealing.

Secondary cooling (second cooling) was performed on the material steel sheets from a plating temperature (meaning a plating bath temperature) or a galvannealing temperature under cooling conditions illustrated in Table 2. On the secondary-cooled material steel sheets, skin pass rolling was performed at an elongation percentage of 0.50% and then a heat treatment was performed under a heat treatment condition illustrated in Table 2, and hot-dip galvanized steel sheets or alloyed galvannealed steel sheets (hereinafter, the hot-dip galvanized steel sheet and the alloyed galvannealed steel sheet will be generically referred to as a "metal coated steel sheet") were obtained.

In the case where a stop temperature of the secondary cooling was set to 100° C., after stopping the secondary cooling, the skin pass rolling was performed without cooling down to room temperature, and then the heat treatment was performed under the heat treatment condition illustrated in Table 2 without cooling down to room temperature. On some of the material steel sheets, the skin pass rolling or the heat treatment was omitted.

"SHEET THICKNESS AFTER ROLLING" of the hot rolling condition illustrated in Table 2 indicates the sheet thickness of the obtained hot-rolled steel sheet. "RESIDENCE TIME IN TEMPERATURE ZONE OF 500 TO 460° C." of an annealing condition illustrated in Table 2 means the residence time in the temperature zone of 500 to 460° C. in the step of performing the first cooling. Regarding "PRESENCE OR ABSENCE OF GALVANNEALING" of the annealing condition illustrated in Table 2, the mark of "PRESENCE" indicates that the galvannealing was performed after the hot-dip galvanizing and the mark of "ABSENCE" indicates that the galvannealing was not performed after the hot-dip galvanizing. "SECONDARY COOLING RATE" of the annealing condition illustrated in Table 2 means the average cooling rate in the temperature zone of the galvannealing temperature to 300° C. in the case where the galvannealing was performed, and means the average cooling rate in the temperature zone of the plating temperature to 300° C. in the case where the galvannealing was not performed. In Table 2, the notation of "RT" indicates room temperature. Regarding "PRESENCE OR ABSENCE OF TEMPER ROLLING" in Table 2, the mark of "PRESENCE" indicates that the temper rolling was performed in the step of performing temper rolling and the mark of "ABSENCE" indicates that the temper rolling was not performed. In the columns with the mention of "HEAT TREATMENT CONDITION" in Table 2, the notation of "-" indicates that the heat treatment was not performed.

TABLE 1

| STEEL | CHEMICAL COMPOSITION (MASS %) (BALANCE: Fe AND IMPURITIES) | | | | | | | | $Ac_1$ POINT (° C.) | $Ac_3$ POINT (° C.) |
| --- | --- | --- | --- | --- | --- | --- | --- | --- | --- | --- |
| | C | Si | Mn | P | S | sol. Al | N | OTHERS | | |
| A | 0.235 | 1.46 | 2.12 | 0.005 | 0.0008 | 0.046 | 0.0022 | | 732 | 838 |
| B | 0.211 | 0.21 | 2.26 | 0.006 | 0.0011 | 0.045 | 0.0024 | | 697 | 785 |
| C | 0.188 | 1.82 | 2.53 | 0.005 | 0.0012 | 0.046 | 0.0034 | | 738 | 853 |
| D | 0.175 | 1.24 | 0.82 | 0.005 | 0.0012 | 0.047 | 0.0036 | | 742 | 884 |
| E | 0.191 | 1.61 | 2.88 | 0.005 | 0.0011 | 0.045 | 0.0033 | Ti: 0.012 | 715 | 846 |
| F | 0.183 | 1.37 | 2.85 | 0.006 | 0.0009 | 0.048 | 0.0027 | Nb: 0.018 | 713 | 835 |
| G | 0.202 | 1.50 | 2.54 | 0.005 | 0.0008 | 0.046 | 0.0035 | Ti: 0.025 B: 0.0019 | 716 | 854 |
| H | 0.227 | 1.32 | 2.06 | 0.004 | 0.0008 | 0.045 | 0.0026 | Cu: 0.28 Ni: 0.16 | 728 | 831 |
| I | 0.177 | 1.63 | 2.51 | 0.006 | 0.0008 | 0.047 | 0.0038 | Cr: 0.52 | 744 | 849 |
| J | 0.182 | 1.65 | 2.70 | 0.005 | 0.0012 | 0.048 | 0.0031 | Mo: 0.17 B: 0.0015 | 734 | 846 |
| K | 0.183 | 1.52 | 2.54 | 0.005 | 0.0011 | 0.047 | 0.0026 | Cr: 0.32 Mo: 0.08 | 735 | 847 |
| L | 0.186 | 1.60 | 2.97 | 0.006 | 0.0012 | 0.046 | 0.0029 | Ca: 0.0008 Mg: 0.0007 | 729 | 838 |
| M | 0.220 | 1.47 | 2.03 | 0.004 | 0.0011 | 0.045 | 0.0032 | Bi: 0.0030 REM: 0.0005 | 736 | 848 |
| N | 0.299 | 1.64 | 3.07 | 0.004 | 0.0009 | 0.049 | 0.0025 | Ti: 0.047 | 717 | 829 |
| O | 0.297 | 1.67 | 2.55 | 0.004 | 0.0008 | 0.048 | 0.0023 | Cr: 0.55 | 742 | 817 |
| P | 0.365 | 1.83 | 2.76 | 0.004 | 0.0008 | 0.047 | 0.0023 | | 740 | 810 |
| Q | 0.234 | 1.45 | 2.10 | 0.005 | 0.001 | 0.089 | 0.0020 | | 740 | 863 |
| R | 0.186 | 1.85 | 2.51 | 0.006 | 0.002 | 0.086 | 0.0035 | | 746 | 879 |
| S | 0.297 | 1.66 | 2.97 | 0.005 | 0.001 | 0.088 | 0.0026 | Ti: 0.045 | 724 | 851 |

TABLE 2

| | | HOT ROLLING CONDITION | | | ANNEALING CONDITION | | |
|---|---|---|---|---|---|---|---|
| TEST NUMBER | STEEL | SHEET THICKNESS AFTER ROLLING (mm) | ROLLING COMPLETION TEMPERATURE (° C.) | COILING TEMPERATURE (° C.) | SOAKING TEMPERATURE (° C.) | AVERAGE COOLING RATE IN TEMPERATURE ZONE OF SOAKING TEMPERATURE TO (SOAKING TEMPERATURE MINUS 50° C.) (° C./s) | AVERAGE COOLING RATE IN TEMPERATURE ZONE OF 650 lb 500° C. (° C./s) |
| A1 | A | 2.5 | 960 | 640 | 820 | 8 | 30 |
| A2 | A | 2.5 | 960 | 640 | 820 | 8 | 30 |
| A3 | A | 2.5 | 960 | 640 | 820 | 8 | 30 |
| A4 | A | 2.5 | 960 | 640 | 820 | 8 | 30 |
| A5 | A | 2.5 | 960 | 640 | 820 | 8 | 30 |
| A6 | A | 2.5 | 960 | 640 | 700 | 8 | 30 |
| A7 | A | 2.5 | 960 | 640 | 820 | 8 | 1 |
| A8 | A | 2.5 | 960 | 640 | 820 | 8 | 30 |
| A9 | A | 2.5 | 960 | 640 | 820 | 8 | 30 |
| A10 | A | 2.5 | 960 | 640 | 820 | 8 | 30 |
| A11 | A | 2.5 | 960 | 640 | 850 | 5 | 30 |
| A12 | B | 3.0 | 900 | 500 | 780 | 2 | 4 |
| A13 | C | 2.5 | 940 | 680 | 840 | 2 | 4 |
| A14 | C | 2.5 | 940 | 680 | 840 | 2 | 4 |
| A15 | C | 2.5 | 940 | 680 | 840 | 2 | 4 |
| A16 | C | 2.5 | 940 | 680 | 840 | 2 | 4 |
| A17 | C | 2.5 | 940 | 680 | 840 | 2 | 4 |
| A18 | C | 2.5 | 940 | 680 | 840 | 2 | 4 |
| A19 | C | 2.5 | 940 | 680 | 840 | 2 | 4 |
| A20 | C | 2.5 | 940 | 680 | 840 | 2 | 4 |
| A21 | C | 2.5 | 940 | 680 | 870 | 2 | 30 |
| A22 | D | 3.0 | 960 | 500 | 840 | 2 | 4 |
| A23 | E | 2.5 | 940 | 600 | 840 | 5 | 30 |
| A24 | E | 2.5 | 940 | 600 | 840 | 5 | 30 |
| A25 | E | 2.5 | 940 | 600 | 840 | 5 | 30 |
| A26 | F | 2.5 | 940 | 600 | 840 | 2 | 4 |
| A27 | F | 2.5 | 940 | 600 | 840 | 2 | 4 |
| A28 | G | 2.5 | 950 | 600 | 870 | 2 | 20 |
| A29 | H | 3.0 | 950 | 600 | 820 | 5 | 30 |
| A30 | I | 2.5 | 960 | 600 | 850 | 5 | 30 |
| A31 | J | 2.5 | 940 | 550 | 850 | 2 | 4 |
| A32 | J | 2.5 | 940 | 550 | 850 | 10 | 10 |
| A33 | K | 3.0 | 960 | 550 | 840 | 2 | 4 |
| A34 | L | 3.0 | 940 | 550 | 840 | 2 | 4 |
| A35 | M | 3.0 | 950 | 600 | 820 | 5 | 30 |
| A36 | N | 2.5 | 950 | 640 | 790 | 2 | 4 |
| A37 | N | 2.5 | 950 | 640 | 790 | 2 | 4 |
| A38 | N | 2.5 | 950 | 640 | 840 | 8 | 4 |
| A39 | N | 2.5 | 950 | 640 | 840 | 8 | 4 |
| A40 | O | 2.5 | 940 | 640 | 780 | 2 | 4 |
| A41 | P | 2.5 | 940 | 640 | 780 | 2 | 4 |
| A42 | P | 2.5 | 940 | 640 | 800 | 2 | 4 |
| A43 | Q | 2.5 | 960 | 640 | 850 | 30 | 30 |
| A44 | R | 2.5 | 940 | 680 | 870 | 5 | 30 |
| A45 | S | 2.5 | 950 | 640 | 840 | 8 | 4 |

| | ANNEALING CONDITION | | | | HEAT TREATMENT CONDITION | |
|---|---|---|---|---|---|---|
| TEST NUMBER | RESIDENCE TIME IN TEMPERATURE ZONE OF 500 TO 460° C. (s) | PRESENCE OR ABSENCE OF GALVANNEALING | SECONDARY COOLING RATE (° C/s) | SECONDARY COOLING STOP TEMPERATURE (° C.) | PRESENCE OR ABSENCE OF TEMPER ROLLING | HEAT TREATMENT TEMPERATURE (° C.) | HEAT TREATMENT TIME (min) |
| A1 | 24 | PRESENCE | 12 | RT | PRESENCE | 410 | 0.5 |
| A2 | 24 | PRESENCE | 12 | RT | PRESENCE | 260 | 360 |
| A3 | 24 | ABSENCE | 12 | RT | PRESENCE | 420 | 0.5 |
| A4 | 24 | PRESENCE | 12 | RT | PRESENCE | 80 | 60 |
| A5 | 24 | PRESENCE | 12 | RT | PRESENCE | 650 | 0.5 |
| A6 | 24 | PRESENCE | 12 | RT | PRESENCE | 450 | 0.5 |
| A7 | 24 | PRESENCE | 12 | RT | PRESENCE | 410 | 20 |
| A8 | 24 | PRESENCE | 1 | RT | PRESENCE | 410 | 20 |
| A9 | 78 | PRESENCE | 12 | RT | PRESENCE | 410 | 0.5 |
| A10 | 24 | PRESENCE | 12 | RT | PRESENCE | | |
| A11 | 24 | PRESENCE | 12 | RT | PRESENCE | 410 | 0.5 |
| A12 | 19 | PRESENCE | 14 | RT | PRESENCE | 400 | 0.5 |
| A13 | 19 | PRESENCE | 14 | RT | PRESENCE | 410 | 1.5 |

TABLE 2-continued

| | | | | | | | |
|---|---|---|---|---|---|---|---|
| A14 | 19 | ABSENCE | 14 | RT | PRESENCE | 450 | 1.0 |
| A15 | 19 | ABSENCE | 14 | RT | ABSENCE | 400 | 1.5 |
| A16 | 19 | PRESENCE | 14 | RT | PRESENCE | 120 | 120 |
| A17 | 19 | PRESENCE | 14 | RT | PRESENCE | 650 | 1.0 |
| A18 | 19 | PRESENCE | 1 | RT | PRESENCE | 400 | 20 |
| A19 | 19 | PRESENCE | 14 | 100 | PRESENCE | 450 | 1.5 |
| A20 | 19 | PRESENCE | 14 | RT | PRESENCE | — | — |
| A21 | 19 | PRESENCE | 14 | RT | PRESENCE | 410 | 1.5 |
| A22 | 19 | PRESENCE | 14 | RT | PRESENCE | 400 | 0.5 |
| A23 | 24 | PRESENCE | 12 | RT | PRESENCE | 410 | 1.5 |
| A24 | 24 | PRESENCE | 12 | RT | ABSENCE | 410 | 1.5 |
| A25 | 24 | PRESENCE | 12 | RT | PRESENCE | 120 | 60 |
| A26 | 19 | PRESENCE | 14 | RT | PRESENCE | 380 | 1.5 |
| A27 | 19 | PRESENCE | 14 | RT | PRESENCE | 620 | 2.0 |
| A28 | 19 | PRESENCE | 14 | RT | PRESENCE | 410 | 0.5 |
| A29 | 24 | ABSENCE | 14 | RT | PRESENCE | 410 | 0.5 |
| A30 | 24 | PRESENCE | 12 | RT | PRESENCE | 350 | 0.5 |
| A31 | 19 | PRESENCE | 14 | RT | PRESENCE | 410 | 0.5 |
| A32 | 14 | ABSENCE | 14 | RT | PRESENCE | 380 | 1.5 |
| A33 | 19 | PRESENCE | 14 | RT | PRESENCE | 410 | 1.0 |
| A34 | 19 | PRESENCE | 14 | RT | PRESENCE | 410 | 1.5 |
| A35 | 24 | PRESENCE | 12 | RT | PRESENCE | 350 | 0.5 |
| A36 | 19 | PRESENCE | 14 | RT | PRESENCE | 260 | 180 |
| A37 | 19 | ABSENCE | 14 | RT | PRESENCE | 420 | 1.5 |
| A38 | 19 | PRESENCE | 14 | RT | ABSENCE | 400 | 1.5 |
| A39 | 19 | PRESENCE | 14 | RT | PRESENCE | 120 | 180 |
| A40 | 19 | PRESENCE | 14 | RT | PRESENCE | 350 | 1.5 |
| A41 | 19 | PRESENCE | 14 | RT | PRESENCE | 420 | 1.0 |
| A42 | 19 | PRESENCE | 14 | 100 | PRESENCE | 410 | 1.0 |
| A43 | 24 | ABSENCE | 12 | RT | PRESENCE | 390 | 0.5 |
| A44 | 19 | PRESENCE | 14 | RT | PRESENCE | 400 | 0.5 |
| A45 | 19 | ABSENCE | 14 | RT | PRESENCE | 390 | 1.0 |

From the metal coated steel sheets and the material steel sheets obtained after the above-described secondary cooling was finished, each test piece for XRD measurement was collected and a rolled surface of each of the test pieces was chemically polished to a depth positioned at ¼ of the sheet thickness of the steel sheet from the boundary between the steel sheet and a plating layer. An X-ray diffraction test was performed on this rolled surface to measure the volume fraction of retained austenite and the C content in the retained austenite.

Concretely, a Mo—Kα line was entered into the test piece to measure integrated intensities of α phase (200), (211) diffraction peaks and integrated intensities of γ phase (200), (220), (311) diffraction peaks to then find the volume fraction of the retained austenite.

Further, an Fe—Kα line was entered, a lattice constant ($a_\gamma$) of austenite was found from the positions of the γ phase (200), (220), (311) diffraction peaks, and the C content in the retained austenite ($C_\gamma$) was calculated by using the relational expression of $a_\gamma$ (Å)=3.578+0.033×$C_\gamma$ (mass %).

Further, each test piece for SEM observation was collected from the metal coated steel sheets, a longitudinal section of this test piece parallel to the rolling direction was polished, and then this longitudinal section was nital-etched and LePera etched to observe a metal structure at a depth positioned at ¼ of the sheet thickness of the steel sheet from the boundary between the steel sheet and the plating layer. By image processing, volume fractions of tempered martensite, polygonal ferrite, fresh martensite, and the balance structure were measured.

The volume fraction of the fresh martensite was found by subtracting the volume fraction of the retained austenite measured by the above-described XRD measurement from the total of the volume fractions of the retained austenite and the fresh martensite measured by the LePera etching.

A yield strength (YS), a tensile strength (TS), and uniform elongation (UEl) were found by collecting a JIS No. 5 tensile test piece from the plated steel sheet along a direction perpendicular to the rolling direction and performing a tensile test on this test piece.

A tensile speed was set to 1 mm/minute until reaching a yield point and was set to 10 mm/minute on and after the yield point. A yield ratio (YR) was found by dividing YS by TS. As for total elongation (TEl) and local elongation (LEl), a tensile test was performed on a JIS No. 5 tensile test piece collected along a direction perpendicular to the rolling direction, an actual measured value of the total elongation ($TEl_0$) and an actual measured value of the uniform elongation (UEl) were used, and corresponding values equivalent to the case of the sheet thickness being 1.2 mm were found based on Expression (2) and Expression (3) above.

The case where the value of YR is 0.59 or more, the value of TS×UEl is 10000 MPa·% or more, and the value of TS×LEl is 5000 MPa·% or more was judged to be good in properties. Further, the case where the value of TS×UEl is 12000 MPa·% or more and the value of TS×LEl is 6000 MPa·% or more was judged to be particularly good in properties.

Table 3 illustrates results obtained by observing the metal structures after the secondary cooling was finished, results obtained by observing the metal structures of the metal coated steel sheets, and results obtained by evaluating mechanical properties of the metal coated steel sheets.

In the column with the mention of "METAL STRUCTURE AFTER SECONDARY COOLING IS FINISHED" in Table 3, the mark of "-" indicates that the metal structure observation is not performed. In the column with the mention of "C CONTENT IN RETAINED AUSTENITE (MASS %)" in Table 3, the mark of "-" indicates that the measurement of the C content in the retained austenite is not performed. In Table 3, the column with the mention of "TEl" indicates the total elongation converted equivalently to the case of the sheet thickness being 1.2 mm, the column with the mention of "UEl" indicates the uniform elongation, and the column with the mention of "LEl" indicates the local elongation converted equivalently to the case of the sheet thickness being 1.2 mm.

In the column of note in Table 3, the sample with "○" attached thereto is the present invention example and the sample with "X" attached thereto is the comparative example. Incidentally, in Table 1 to Table 3, the numerical value or mark with an underline attached thereto means that it is out of the range of the present invention.

TABLE 3

| TEST NUMBER | STEEL | SHEET THICKNESS OF METAL COATED STEEL SHEET (mm) | METAL STRUCTURE AFTER SECONDARY COOLING IS FINISHED VOLUME FRACTION OF RETAINED AUSTENITE (%) | C CONCENTRATION IN RETAINED AUSTENITE (MASS %) | METAL STRUCTURE OF METAL COATED STEEL SHEET VOLUME FRACTION OF RETAINED AUSTENITE (%) | VOLUME FRACTION OF TEMPERED MARTENSITE (%) | VOLUME FRACTION OF POLYGONAL FERRITE (%) | VOLUME FRACTION OF FRESH MARTENSITE (%) | C CONTENT IN RETAINED AUSTENITE (MASS %) | MECHANICAL PROPERTIES OF METAL COATED STEEL SHEET YS (MPa) |
|---|---|---|---|---|---|---|---|---|---|---|
| A1 | A | 1.2 | 16.4 | 0.78 | 13.1 | 13.8 | 34.7 | 0.6 | 1.05 | 637 |
| A2 | A | 1.2 | 16.2 | 0.78 | 10.2 | 13.5 | 34.5 | 0.3 | 1.14 | 635 |
| A3 | A | 1.2 | 16.6 | 0.79 | 13.2 | 13.2 | 34.9 | 0.7 | 1.01 | 642 |
| A4 | A | 1.2 | 16.2 | 0.79 | 15.0 | <u><0.1</u> | 35.0 | 13.4 | <u>0.84</u> | 520 |
| A5 | A | 1.2 | 16.3 | 0.80 | <u>4.3</u> | 13.7 | 35.1 | 5.8 | 0.88 | 486 |
| A6 | A | 1.2 | 0.0 | — | <u>0.0</u> | <u><0.1</u> | 72.5 | <0.1 | — | 483 |
| A7 | A | 1.2 | 8.8 | 0.82 | <u>4.3</u> | <u>3.9</u> | 56.0 | 1.8 | 0.92 | 455 |
| A8 | A | 1.2 | 10.8 | 0.89 | <u>4.6</u> | 10.5 | 35.9 | 3.1 | 0.93 | 516 |
| A9 | A | 1.2 | 15.0 | 0.86 | 12.2 | 12.6 | 35.2 | 1.1 | 0.99 | 617 |
| A10 | A | 1.2 | 16.3 | 0.79 | 15.3 | <u><0.1</u> | 34.8 | 13.8 | <u>0.81</u> | 512 |
| A11 | A | 1.2 | 14.1 | 0.73 | 12.0 | 24.8 | 6.3 | 0.5 | 1.02 | 746 |
| A12 | B | 1.6 | 3.7 | 0.63 | <u>1.0</u> | 27.6 | 58.4 | 2.5 | <u>0.68</u> | 435 |
| A13 | C | 1.2 | 10.4 | 0.61 | 8.3 | 49.4 | 23.3 | 0.4 | 0.90 | 902 |
| A14 | C | 1.2 | 10.4 | 0.61 | 8.0 | 49.5 | 23.0 | 0.2 | 0.88 | 925 |
| A15 | C | 1.2 | 10.5 | 0.60 | 7.0 | 47.8 | 23.1 | 2.1 | <u>0.84</u> | 801 |
| A16 | C | 1.2 | 10.5 | 0.60 | 9.3 | <u><0.1</u> | 23.3 | 49.2 | <u>0.64</u> | 722 |
| A17 | C | 1.2 | 10.7 | 0.61 | <u>4.1</u> | 49.3 | 23.1 | 3.6 | <u>0.69</u> | 659 |
| A18 | C | 1.2 | 7.9 | 0.65 | <u>4.2</u> | 45.2 | 23.3 | 3.0 | <u>0.73</u> | 725 |
| A19 | C | 1.2 | — | — | 12.4 | 43.5 | 23.2 | 1.6 | 0.85 | 824 |
| A20 | C | 1.2 | 10.2 | 0.60 | 9.4 | <u><0.1</u> | 22.6 | 49.5 | <u>0.62</u> | 703 |
| A21 | C | 1.2 | 9.2 | 0.57 | 7.5 | 56.3 | 3.6 | 0.4 | 0.87 | 1033 |
| A22 | D | 1.6 | 8.3 | 0.86 | <u>4.5</u> | 15.1 | 51.8 | 2.3 | 0.95 | 448 |
| A23 | E | 1.2 | 12.0 | 0.58 | 9.2 | 54.8 | 19.1 | 0.5 | 0.87 | 954 |
| A24 | E | 1.2 | 12.2 | 0.59 | 7.8 | 53.6 | 19.0 | 2.2 | <u>0.83</u> | 803 |
| A25 | E | 1.2 | 12.2 | 0.58 | 10.6 | <u><0.1</u> | 19.1 | 55.2 | <u>0.60</u> | 769 |
| A26 | F | 1.2 | 11.6 | 0.58 | 10.3 | 52.7 | 22.4 | 0.4 | 0.88 | 888 |
| A27 | F | 1.2 | 11.5 | 0.58 | <u>4.8</u> | 52.9 | 22.2 | 3.2 | <u>0.70</u> | 650 |
| A28 | G | 1.2 | 11.4 | 0.58 | 9.1 | 65.5 | 3.1 | 0.3 | 0.89 | 938 |
| A29 | H | 1.6 | 16.7 | 0.78 | 13.3 | 14.9 | 33.3 | 0.6 | 1.03 | 641 |
| A30 | I | 1.2 | 10.4 | 0.59 | 8.7 | 49.0 | 22.7 | 0.4 | 0.92 | 888 |
| A31 | J | 1.2 | 14.3 | 0.57 | 11.1 | 60.2 | 8.2 | 0.5 | 0.89 | 1003 |
| A32 | J | 1.2 | 15.5 | 0.57 | 11.9 | 65.4 | 0.8 | 0.5 | 0.89 | 1056 |
| A33 | K | 1.6 | 10.0 | 0.59 | 8.1 | 65.1 | 24.9 | 0.5 | 0.90 | 890 |
| A34 | L | 1.6 | 11.7 | 0.58 | 8.8 | 54.3 | 20.4 | 0.4 | 0.87 | 918 |
| A35 | M | 1.6 | 16.1 | 0.78 | 12.9 | 13.8 | 35.2 | 0.5 | 1.10 | 647 |
| A36 | N | 1.2 | 21.2 | 0.66 | 14.7 | 57.2 | 18.6 | 0.3 | 0.91 | 1162 |
| A37 | N | 1.2 | 20.8 | 0.65 | 16.7 | 57.4 | 18.2 | 0.5 | 0.86 | 1154 |
| A38 | N | 1.2 | 16.1 | 0.56 | 11.4 | 74.0 | 1.7 | 2.3 | <u>0.79</u> | 984 |
| A39 | N | 1.2 | 16.0 | 0.56 | 14.7 | <u><0.1</u> | 1.6 | 75.7 | <u>0.57</u> | 938 |
| A40 | O | 1.2 | 20.3 | 0.67 | 15.5 | 55.8 | 20.1 | 0.4 | 0.90 | 1163 |
| A41 | P | 1.2 | 20.7 | 0.66 | 16.8 | 57.0 | 19.0 | 0.5 | 0.90 | 1179 |
| A42 | P | 1.2 | — | — | 22.5 | 55.9 | 2.9 | 1.8 | 0.91 | 1092 |
| A43 | Q | 1.2 | 14.5 | 0.76 | 11.7 | 25.5 | 3.7 | 0.4 | 1.01 | 762 |
| A44 | R | 1.2 | 9.8 | 0.60 | 7.0 | 57.3 | 1.5 | 0.5 | 0.91 | 1072 |
| A45 | S | 1.2 | 17.2 | 0.58 | 11.7 | 74.2 | 1.8 | 0.5 | 0.87 | 1112 |

| TEST NUMBER | TS (MPa) | YR | TEI (%) | UEI (%) | LEI (%) | TS × TEI (MPa · %) | TS × UEI (MPa · %) | TS × LEI (MPa · %) | NOTE |
|---|---|---|---|---|---|---|---|---|---|
| A1 | 1022 | 0.62 | 25.7 | 20.3 | 5.4 | 26265 | 20747 | 5519 | ○ |
| A2 | 1008 | 0.63 | 22.9 | 17.0 | 5.9 | 23083 | 17136 | 5947 | ○ |
| A3 | 1036 | 0.62 | 26.6 | 21.2 | 5.4 | 27558 | 21963 | 5594 | ○ |
| A4 | 1092 | 0.48 | 15.1 | 13.6 | 1.5 | 16489 | 14851 | 1638 | x |
| A5 | 974 | 0.50 | 14.4 | 10.2 | 4.2 | 14026 | 9935 | 4091 | x |
| A6 | 782 | 0.62 | 18.6 | 11.7 | 6.9 | 14545 | 9149 | 5396 | x |
| A7 | 966 | 0.47 | 16.7 | 12.2 | 4.5 | 16132 | 11785 | 4347 | x |
| A8 | 1004 | 0.51 | 16.4 | 12.0 | 4.4 | 16466 | 12048 | 4418 | x |
| A9 | 1029 | 0.60 | 22.5 | 17.5 | 5.0 | 23153 | 18008 | 5145 | ○ |
| A10 | 1114 | 0.46 | 14.4 | 13.0 | 1.4 | 16042 | 14482 | 1560 | x |
| A11 | 1113 | 0.67 | 22.6 | 16.7 | 5.9 | 25154 | 18587 | 6567 | ○ |

TABLE 3-continued

| | | | | | | | | | |
|---|---|---|---|---|---|---|---|---|---|
| A12 | 903 | 0.48 | 14.6 | 9.3 | 5.3 | 13184 | 8398 | 4786 | x |
| A13 | 1224 | 0.74 | 15.5 | 9.7 | 5.8 | 18972 | 11873 | 7099 | ○ |
| A14 | 1238 | 0.75 | 15.4 | 9.3 | 6.1 | 19065 | 11513 | 7552 | ○ |
| A15 | 1230 | 0.65 | 11.6 | 7.9 | 3.7 | 14268 | 9717 | 4551 | x |
| A16 | 1361 | 0.53 | 9.4 | 7.1 | 2.3 | 12793 | 9663 | 3130 | x |
| A17 | 1178 | 0.56 | 11.3 | 7.5 | 3.8 | 13311 | 8835 | 4476 | x |
| A18 | 1171 | 0.62 | 12.2 | 8.4 | 3.8 | 14286 | 9836 | 4450 | x |
| A19 | 1194 | 0.69 | 16.7 | 11.7 | 5.0 | 19940 | 13970 | 5970 | ○ |
| A20 | 1382 | 0.51 | 8.9 | 6.8 | 2.1 | 12300 | 9398 | 2902 | x |
| A21 | 1308 | 0.79 | 15.3 | 9.3 | 6.0 | 20012 | 12164 | 7848 | ○ |
| A22 | 863 | 0.52 | 19.7 | 14.8 | 4.9 | 17001 | 12772 | 4229 | x |
| A23 | 1255 | 0.76 | 15.5 | 9.3 | 6.2 | 19453 | 11672 | 7781 | ○ |
| A24 | 1264 | 0.64 | 11.5 | 7.8 | 3.7 | 14536 | 9859 | 4677 | x |
| A25 | 1398 | 0.55 | 9.1 | 7.0 | 2.1 | 12722 | 9786 | 2936 | x |
| A26 | 1217 | 0.73 | 17.2 | 11.0 | 6.2 | 20932 | 13387 | 7545 | ○ |
| A27 | 1162 | 0.56 | 11.3 | 7.8 | 3.5 | 13131 | 9064 | 4067 | x |
| A28 | 1250 | 0.75 | 16.2 | 10.0 | 6.2 | 20250 | 12500 | 7750 | ○ |
| A29 | 1031 | 0.62 | 25.3 | 19.8 | 5.5 | 26084 | 20414 | 5671 | ○ |
| A30 | 1199 | 0.74 | 16.9 | 10.7 | 6.2 | 20263 | 12829 | 7434 | ○ |
| A31 | 1297 | 0.77 | 15.5 | 9.9 | 5.6 | 20104 | 12840 | 7263 | ○ |
| A32 | 1320 | 0.80 | 13.6 | 7.8 | 5.8 | 17952 | 10296 | 7656 | ○ |
| A33 | 1205 | 0.74 | 15.6 | 9.9 | 5.7 | 18798 | 11930 | 6869 | ○ |
| A34 | 1247 | 0.74 | 16.6 | 10.1 | 6.5 | 20700 | 12595 | 8106 | ○ |
| A35 | 1013 | 0.64 | 24.8 | 19.5 | 5.3 | 25122 | 19754 | 5369 | ○ |
| A36 | 1523 | 0.76 | 15.0 | 11.2 | 3.8 | 22845 | 17058 | 5787 | ○ |
| A37 | 1480 | 0.78 | 15.8 | 12.0 | 3.8 | 23384 | 17760 | 5624 | ○ |
| A38 | 1492 | 0.66 | 9.8 | 6.6 | 3.2 | 14622 | 9847 | 4774 | x |
| A39 | 1675 | 0.56 | 7.5 | 5.6 | 1.9 | 12563 | 9380 | 3183 | x |
| A40 | 1472 | 0.79 | 15.4 | 11.5 | 3.9 | 22669 | 16928 | 5741 | ○ |
| A41 | 1531 | 0.77 | 16.5 | 12.9 | 3.6 | 25262 | 19750 | 5512 | ○ |
| A42 | 1517 | 0.72 | 17.5 | 13.8 | 3.7 | 26548 | 20935 | 5613 | ○ |
| A43 | 1120 | 0.68 | 20.9 | 15.6 | 5.3 | 23408 | 17472 | 5936 | ○ |
| A44 | 1324 | 0.81 | 14.9 | 8.7 | 6.2 | 19728 | 11519 | 8209 | ○ |
| A45 | 1483 | 0.75 | 13.1 | 8.0 | 5.1 | 19427 | 11864 | 7563 | ○ |

The invention examples with the mark of ○ attached thereto in the column of note (test numbers A1 to A3, A9, A11, A13, A14, A19, A21, A23, A26, A28 to A37, and A40 to A45) each had 10000 or more of TS×UEl and 5000 or more of TS×LEl and exhibited good uniform ductility and local ductility. Further, as for YR, they exhibited a high value of 0.59 or more. Particularly, the test numbers A11, A21, A26, A28, A30, A31, and A34 each contained 16% or more of tempered martensite and greater than 2.0% of polygonal ferrite, had 12000 or more of TS×UEl and 6000 or more of TS×LEl, and exhibited particularly good uniform ductility and local ductility.

On the other hand, test results of the steel sheets with the chemical composition or the step conditions being out of the range of the present invention (test numbers with the mark of X attached thereto in the column of note A4 to A8, A10, A12, A15 to A18, A20, A22, A24, A25, A27, A38, and A39) were each poor in one or all of the yield ratio, the uniform ductility, and the local ductility.

Concretely, in the test numbers A15, A24, and A38 in which the steel C, E, or N each having the chemical composition falling within the range of the present invention were used but the skin pass rolling was not performed, TS×UEl and TS×LEl were low. In the tests using the steel A or C (test numbers A10 and A20), the heat treatment was not performed, and thus in the test number A10, the values of YR and TS×LEl were low, and in the test number A20, the values of YR, TS×UEl, and TS×LEl were low.

In the tests using the steel A, C, E, or N (test numbers A4, A16, A25, and A39), the heat treatment temperature was too low, and thus in the test number A4, the values of YR and TS×LEl were low, and in the test numbers A16, A25, and A39, the values of YR, TS×UEl, and TS×LEl were low. Further, in the tests using the steel A, C, or F (test numbers A5, A17, and A27), the heat treatment temperature was too high, and thus the values of YR, TS×UEl, and TS×LEl were low.

In the test number A6 in which the steel A having the chemical composition falling within the range of the present invention was used but the soaking temperature was too low in the annealing step, TS×UEl was low.

In the test using the steel A (test number A7), the average cooling rate in the temperature zone of 650 to 500° C. was too low in the first cooling step, and thus YR and TS×LEl were low.

In the tests using the steel A or C (test numbers A8 and A18), the average cooling rate (secondary cooling rate) in the temperature zone of the galvannealing temperature to 300° C. was too low in the second cooling step, and thus in the test number A8, the values of YR and TS×LEl were low, and in the test number A18, the values of TS×UEl and TS×LEl were low.

In the test number A12 using the steel B, the Si content in the steel was small, and thus the values of YR, TS×UEl, and TS×LEl were low. In the test number A22 using the steel D, the Mn content in the steel was small, and thus YR and TS×LEl were low.

Example 2

Experiments were performed by the same processes as those of Example 1, and with the steels A to S illustrated in Table 1, metal coated steel sheets were manufactured under conditions illustrated in Table 4. Results are illustrated in Table 5. Incidentally, measurement processes are the same as those of Example 1.

Further, as for the Mn content in the retained austenite, each test piece for EBSP measurement was collected from the metal coated steel sheets, a longitudinal section parallel to the rolling direction was electropolished, and then a metal structure at a depth positioned at ¼ of the sheet thickness of the steel sheet from the boundary between the steel sheet and a plating layer was observed to confirm the distribution of retained austenite by image processing. Then, a SEM equipped with a FE-EPMA was used to observe the metal structure in the same visual field, and the EMPA measurement was performed on 10 or more retained austenite grains to measure the Mn content in the retained austenite. The average value of the obtained Mn contents was found and this average value was set as the Mn content in the retained austenite ($[Mn]_\gamma$). The Mn content of the steel sheet being a base material was set as $[Mn]_{ave}$ and $[Mn]_\gamma/[Mn]_{ave}$ was calculated.

The case where the value of YR is 0.59 or more, the value of TS×UEl is 10000 MPa·% or more, and the value of TS×LEl is 5000 MPa·% or more was judged to be good in properties. Further, the case where the value of TS×UEl is 12000 MPa·% or more and the value of TS×LEl is 6000 MPa·% or more was judged to be particularly good in properties.

Further, explanations of Table 4 and Table 5 are the same as those of Table 2 and Table 3 respectively. Further, in the column with the mention of "$[Mn]_\gamma/[Mn]_{ave}$," the mark of "-" indicates that the measurement of the Mn content in the retained austenite is not performed.

TABLE 4

| | | HOT ROLLING CONDITION | | | ANNEALING CONDITION | | |
|---|---|---|---|---|---|---|---|
| TEST NUMBER | SHEET | SHEET THICKNESS AFTER ROLLING (mm) | ROLLING COMPLETION TEMPERATURE (° C.) | COILING TEMPERATURE (° C.) | SOAKING TEMPERATURE (° C.) | AVERAGE COOLING RATE IN TEMPERATURE ZONE OF SOAKING TEMPERATURE TO (SOAKING TEMPERATURE MINUS 50° C.) (° C./S) | AVERAGE COOLING RATE IN TEMPERATURE ZONE OF 650 to 500° C. (° C./s) |
| B1 | A | 2.5 | 960 | 640 | 850 | 5 | 30 |
| B2 | A | 2.5 | 960 | 640 | 850 | 30 | 30 |
| B3 | A | 2.5 | 960 | 640 | 820 | 8 | 1 |
| B4 | B | 3.0 | 900 | 500 | 790 | 8 | 4 |
| B5 | C | 2.5 | 940 | 680 | 870 | 2 | 30 |
| B6 | C | 2.5 | 940 | 680 | 870 | 2 | 30 |
| B7 | C | 2.5 | 940 | 680 | 870 | 2 | 30 |
| B8 | C | 2.5 | 940 | 680 | 870 | 2 | 30 |
| B9 | C | 2.5 | 940 | 680 | 870 | 2 | 30 |
| B10 | C | 2.5 | 940 | 680 | 870 | 2 | 30 |
| B11 | C | 2.5 | 940 | 680 | 870 | 2 | 30 |
| B12 | C | 2.5 | 940 | 680 | 870 | 2 | 30 |
| B13 | C | 2.5 | 940 | 680 | 840 | 2 | 30 |
| B14 | C | 2.5 | 940 | 680 | 870 | 30 | 30 |
| B15 | C | 2.5 | 940 | 680 | 820 | 2 | 1 |
| B16 | C | 2.5 | 940 | 680 | 700 | 2 | 30 |
| B17 | D | 3.0 | 960 | 500 | 900 | 10 | 4 |
| B18 | E | 2.5 | 940 | 600 | 860 | 2 | 30 |
| B19 | E | 2.5 | 940 | 600 | 860 | 2 | 30 |
| B20 | E | 2.5 | 940 | 600 | 860 | 2 | 30 |
| B21 | E | 2.5 | 940 | 600 | 860 | 30 | 30 |
| B22 | E | 2.5 | 940 | 600 | 840 | 20 | 30 |
| B23 | F | 2.5 | 940 | 600 | 850 | 2 | 20 |
| B24 | F | 2.5 | 940 | 600 | 850 | 2 | 20 |
| B25 | G | 2.5 | 950 | 600 | 870 | 8 | 20 |
| B26 | G | 2.5 | 950 | 600 | 870 | 2 | 20 |
| B27 | H | 3.0 | 950 | 600 | 850 | 5 | 30 |
| B28 | I | 2.5 | 960 | 600 | 840 | 5 | 30 |
| B29 | I | 2.5 | 960 | 600 | 860 | 1 | 30 |
| B30 | J | 2.5 | 940 | 550 | 850 | 2 | 10 |
| B31 | J | 2.5 | 940 | 550 | 850 | 10 | 10 |
| B32 | K | 3.0 | 960 | 550 | 860 | 2 | 10 |
| B33 | L | 3.0 | 940 | 550 | 850 | 2 | 30 |
| B34 | M | 3.0 | 950 | 600 | 860 | 5 | 30 |
| B35 | N | 2.5 | 950 | 640 | 840 | 1 | 4 |
| B36 | N | 2.5 | 950 | 640 | 840 | 8 | 4 |
| B37 | N | 2.5 | 950 | 640 | 840 | 8 | 4 |
| B38 | O | 2.5 | 940 | 640 | 830 | 1 | 20 |
| B39 | P | 2.5 | 940 | 640 | 830 | 2 | 20 |
| B40 | Q | 2.5 | 960 | 640 | 850 | 30 | 30 |
| B41 | R | 2.5 | 940 | 680 | 870 | 5 | 30 |
| B42 | S | 2.5 | 950 | 640 | 840 | 8 | 4 |

| | ANNEALING CONDITION | | | | | |
|---|---|---|---|---|---|---|
| TEST NUMBER | PRESENCE OR ABSENCE OF GALVANNEALING | SECONDARY COOLING RATE (° C./s) | SECONDARY COOLING STOP TEMPERATURE (° C.) | PRESENCE OR ABSENCE OF TEMPER ROLLING | HEAT TREATMENT TEMPERATURE (° C.) | HEAT TREATMENT TIME (min) |
| B1 | PRESENCE | 12 | RT | PRESENCE | 410 | 0.5 |
| B2 | ABSENCE | 12 | RT | PRESENCE | 380 | 0.5 |

TABLE 4-continued

| | | | | | | | |
|---|---|---|---|---|---|---|---|
| B3 | PRESENCE | 12 | RT | PRESENCE | 410 | 20 |
| B4 | PRESENCE | 14 | RT | PRESENCE | 400 | 0.5 |
| B5 | PRESENCE | 14 | RT | PRESENCE | 410 | 1.5 |
| B6 | ABSENCE | 14 | RT | PRESENCE | 450 | 1.0 |
| B7 | ABSENCE | 14 | RT | ABSENCE | 400 | 1.5 |
| B8 | PRESENCE | 14 | RT | PRESENCE | 120 | 120 |
| B9 | PRESENCE | 14 | RT | PRESENCE | 650 | 1.0 |
| B10 | PRESENCE | 1 | RT | PRESENCE | 400 | 20 |
| B11 | PRESENCE | 14 | 100 | PRESENCE | 450 | 1.5 |
| B12 | PRESENCE | 14 | RT | PRESENCE | — | — |
| B13 | PRESENCE | 14 | RT | PRESENCE | 410 | 1.0 |
| B14 | ABSENCE | 14 | RT | PRESENCE | 380 | 1.0 |
| B15 | PRESENCE | 14 | RT | PRESENCE | 410 | 2.0 |
| B16 | ABSENCE | 14 | RT | PRESENCE | 450 | 0.5 |
| B17 | PRESENCE | 14 | RT | PRESENCE | 400 | 0.5 |
| B18 | PRESENCE | 12 | RT | PRESENCE | 410 | 1.5 |
| B19 | PRESENCE | 12 | RT | ABSENCE | 410 | 1.5 |
| B20 | PRESENCE | 12 | RT | PRESENCE | 120 | 60 |
| B21 | PRESENCE | 12 | RT | PRESENCE | 400 | 0.5 |
| B22 | PRESENCE | 12 | RT | PRESENCE | 400 | 1.0 |
| B23 | PRESENCE | 14 | RT | PRESENCE | 380 | 1.5 |
| B24 | PRESENCE | 14 | RT | PRESENCE | 620 | 2.0 |
| B25 | PRESENCE | 14 | RT | PRESENCE | 380 | 1.0 |
| B26 | PRESENCE | 14 | RT | PRESENCE | 410 | 0.5 |
| B27 | ABSENCE | 14 | RT | PRESENCE | 410 | 0.5 |
| B28 | PRESENCE | 12 | RT | PRESENCE | 350 | 0.5 |
| B29 | PRESENCE | 12 | RT | PRESENCE | 450 | 1.5 |
| B30 | PRESENCE | 14 | RT | PRESENCE | 450 | 1.5 |
| B31 | ABSENCE | 14 | RT | PRESENCE | 380 | 1.5 |
| B32 | PRESENCE | 14 | RT | PRESENCE | 410 | 1.0 |
| B33 | PRESENCE | 14 | RT | PRESENCE | 410 | 1.5 |
| B34 | PRESENCE | 12 | RT | PRESENCE | 350 | 0.5 |
| B35 | ABSENCE | 14 | RT | PRESENCE | 420 | 1.5 |
| B36 | PRESENCE | 14 | RT | ABSENCE | 400 | 1.5 |
| B37 | PRESENCE | 14 | RT | PRESENCE | 120 | 180 |
| B38 | PRESENCE | 14 | RT | PRESENCE | 350 | 1.5 |
| B39 | PRESENCE | 14 | RT | PRESENCE | 420 | 1.0 |
| B40 | ABSENCE | 12 | RT | PRESENCE | 390 | 0.5 |
| B41 | PRESENCE | 14 | RT | PRESENCE | 400 | 0.5 |
| B42 | ABSENCE | 14 | RT | PRESENCE | 390 | 1.0 |

TABLE 5

| TEST NUMBER | STEEL | SHEET THICKNESS OF METAL COATED STEEL SHEET (mm) | METAL STRUCTURE OF METAL COATED STEEL SHEET | | | | | | MECHANICAL PROPERTIES OF METAL COATED STEEL SHEET YS (MPa) |
|---|---|---|---|---|---|---|---|---|---|
| | | | VOLUME FRACTION OF RETAINED AUSTENITE (%) | VOLUME FRACTION OF TEMPERED MARTENSITE (%) | VOLUME FRACTION OF POLYGONAL FERRITE (%) | VOLUME FRACTION OF FRESH MARTENSITE (%) | C CONTENT IN RETAINED AUSTENITE (MASS %) | $[Mn]_\gamma/[Mn]_{ave}$ | |
| B1 | A | 1.2 | 12.0 | 24.8 | 6.3 | 0.5 | 1.02 | 1.13 | 746 |
| B2 | A | 1.2 | 11.6 | 27.2 | 1.7 | 0.5 | 1.05 | 1.07 | 792 |
| B3 | A | 1.2 | 4.3 | 3.9 | 56.0 | 1.8 | 0.92 | 1.09 | 455 |
| B4 | B | 1.6 | 0.7 | 37.9 | 11.4 | 2.0 | 0.69 | 1.08 | 569 |
| B5 | C | 1.2 | 7.5 | 56.3 | 3.6 | 0.4 | 0.87 | 1.14 | 1033 |
| B6 | C | 1.2 | 7.3 | 56.5 | 3.2 | 0.3 | 0.89 | 1.17 | 1066 |
| B7 | C | 1.2 | 6.3 | 55.0 | 4.1 | 2.3 | 0.83 | 1.08 | 927 |
| B8 | C | 1.2 | 8.8 | <0.1 | 2.2 | 56.1 | 0.64 | 1.05 | 833 |
| B9 | C | 1.2 | 4.0 | 56.6 | 2.9 | 3.7 | 0.66 | 1.20 | 724 |
| B10 | C | 1.2 | 4.1 | 52.5 | 4.0 | 3.2 | 0.75 | 1.15 | 816 |
| B11 | C | 1.2 | 11.2 | 50.1 | 3.0 | 1.9 | 0.87 | 1.16 | 932 |
| B12 | C | 1.2 | 8.5 | <0.1 | 3.3 | 56.7 | 0.59 | 1.04 | 782 |
| B13 | C | 1.2 | 8.2 | 57.2 | 6.4 | 0.4 | 0.89 | 1.09 | 989 |
| B14 | C | 1.2 | 7.0 | 56.9 | 1.3 | 0.5 | 0.88 | 1.07 | 1040 |
| B15 | C | 1.2 | 4.6 | 9.2 | 41.1 | 3.2 | 0.88 | 1.08 | 669 |
| B16 | C | 1.2 | <0.1 | <0.1 | 81.3 | <0.1 | — | — | 536 |
| B17 | D | 1.6 | 3.2 | 24.2 | 13.1 | 2.4 | 0.92 | 1.03 | 533 |
| B18 | E | 1.2 | 8.3 | 63.7 | 2.1 | 0.6 | 0.87 | 1.18 | 1028 |
| B19 | E | 1.2 | 7.0 | 62.0 | 2.5 | 2.4 | 0.82 | 1.09 | 878 |
| B20 | E | 1.2 | 8.6 | <0.1 | 2.2 | 64.2 | 0.57 | 1.06 | 772 |
| B21 | E | 1.2 | 7.0 | 64.1 | 1.2 | 0.5 | 0.86 | 1.08 | 1079 |
| B22 | E | 1.2 | 8.5 | 64.4 | 4.5 | 0.5 | 0.87 | 1.09 | 1055 |
| B23 | F | 1.2 | 9.4 | 54.5 | 2.5 | 0.5 | 0.86 | 1.16 | 984 |
| B24 | F | 1.2 | 4.2 | 54.6 | 2.8 | 3.5 | 0.69 | 1.23 | 715 |
| B25 | G | 1.2 | 7.5 | 64.4 | 1.3 | 0.4 | 0.88 | 1.07 | 975 |
| B26 | G | 1.2 | 9.1 | 65.5 | 3.1 | 0.3 | 0.89 | 1.15 | 938 |

TABLE 5-continued

| | | | | | | | | | |
|---|---|---|---|---|---|---|---|---|---|
| B27 | H | 1.6 | 11.9 | 25.2 | 4.2 | 0.7 | 1.00 | 1.12 | 725 |
| B28 | I | 1.2 | 7.8 | 55.4 | 5.8 | 0.5 | 0.93 | 1.08 | 932 |
| B29 | I | 1.2 | 7.0 | 57.2 | 3.7 | 0.6 | 0.95 | 1.17 | 968 |
| B30 | J | 1.2 | 12.2 | 65.1 | 2.8 | 0.4 | 0.90 | 1.20 | 1016 |
| B31 | J | 1.2 | 11.9 | 65.4 | 0.8 | 0.5 | 0.89 | 1.06 | 1056 |
| B32 | K | 1.6 | 8.2 | 60.2 | 4.8 | 0.4 | 0.88 | 1.15 | 960 |
| B33 | L | 1.6 | 8.7 | 57.5 | 5.1 | 0.3 | 0.87 | 1.19 | 971 |
| B34 | M | 1.6 | 11.6 | 28.8 | 6.9 | 0.2 | 1.08 | 1.12 | 730 |
| B35 | N | 1.2 | 15.4 | 70.6 | 3.2 | 0.3 | 0.90 | 1.21 | 1179 |
| B36 | N | 1.2 | 11.4 | 74.0 | 1.7 | 2.3 | <u>0.79</u> | 1.08 | 984 |
| B37 | N | 1.2 | 14.7 | ≤0.1 | 1.6 | 75.7 | <u>0.57</u> | 1.06 | 938 |
| B38 | O | 1.2 | 14.7 | 69.2 | 3.6 | 0.5 | 0.88 | 1.12 | 1183 |
| B39 | P | 1.2 | 16.1 | 74.0 | 4.1 | 0.5 | 0.91 | 1.17 | 1214 |
| B40 | Q | 1.2 | 11.7 | 25.5 | 3.7 | 0.4 | 1.01 | 1.08 | 762 |
| B41 | R | 1.2 | 7.0 | 57.3 | 1.5 | 0.5 | 0.91 | 1.07 | 1072 |
| B42 | S | 1.2 | 11.7 | 74.2 | 1.8 | 0.5 | 0.87 | 1.05 | 1112 |

| | MECHANICAL PROPERTIES OF METAL COATED STEEL SHEET | | | | | | | |
|---|---|---|---|---|---|---|---|---|
| TEST NUMBER | TS (MPa) | YR | TEI (%) | UEI (%) | LEI (%) | TS × TEI (MPa · %) | TS × UEI (MPa · %) | TS × LEI (MPa · %) | NOTE |
| B1 | 1113 | 0.67 | 22.6 | 16.7 | 5.9 | 25154 | 18587 | 6567 | ○ |
| B2 | 1165 | 0.68 | 22.2 | 17.2 | 5.0 | 25853 | 20038 | 5825 | ○ |
| B3 | 966 | 0.47 | 16.7 | 12.2 | 4.5 | 16132 | 11785 | 4347 | x |
| B4 | 1034 | 0.55 | 11.4 | 6.6 | 4.8 | 11788 | 6824 | 4963 | x |
| B5 | 1308 | 0.79 | 15.3 | 9.3 | 6.0 | 20012 | 12164 | 7848 | ○ |
| B6 | 1316 | 0.81 | 15.3 | 9.2 | 6.1 | 20135 | 12107 | 8028 | ○ |
| B7 | 1305 | 0.71 | 11.1 | 7.5 | 3.6 | 14486 | 9788 | 4698 | x |
| B8 | 1487 | 0.56 | 7.6 | 5.7 | 1.9 | 11301 | 8476 | 2825 | x |
| B9 | 1248 | 0.58 | 10.1 | 6.6 | 3.5 | 12605 | 8237 | 4368 | x |
| B10 | 1236 | 0.66 | 11.0 | 7.5 | 3.5 | 13596 | 9270 | 4326 | x |
| B11 | 1277 | 0.73 | 15.0 | 9.7 | 5.3 | 19155 | 12387 | 6768 | ○ |
| B12 | 1475 | 0.53 | 7.7 | 5.4 | 2.3 | 11358 | 7965 | 3393 | x |
| B13 | 1285 | 0.77 | 14.9 | 8.7 | 6.2 | 19147 | 11180 | 7967 | ○ |
| B14 | 1317 | 0.79 | 14.3 | 8.2 | 6.1 | 18833 | 10799 | 8034 | ○ |
| B15 | 1154 | 0.58 | 11.9 | 8.2 | 3.7 | 13733 | 9463 | 4270 | x |
| B16 | 838 | 0.64 | 17.4 | 10.8 | 6.6 | 14581 | 9050 | 5531 | x |
| B17 | 951 | 0.56 | 17.5 | 12.8 | 4.7 | 16643 | 12173 | 4470 | x |
| B18 | 1318 | 0.78 | 15.3 | 9.2 | 6.1 | 20165 | 12126 | 8040 | ○ |
| B19 | 1330 | 0.66 | 11.0 | 7.4 | 3.6 | 14630 | 9842 | 4788 | x |
| B20 | 1485 | 0.52 | 8.4 | 6.1 | 2.3 | 12474 | 9059 | 3416 | x |
| B21 | 1332 | 0.81 | 13.6 | 7.6 | 6.0 | 18115 | 10123 | 7992 | ○ |
| B22 | 1336 | 0.79 | 14.8 | 8.6 | 6.2 | 19773 | 11490 | 8283 | ○ |
| B23 | 1295 | 0.76 | 16.1 | 9.8 | 6.3 | 20850 | 12691 | 8159 | ○ |
| B24 | 1233 | 0.58 | 10.4 | 6.6 | 3.8 | 12823 | 8138 | 4685 | x |
| B25 | 1266 | 0.77 | 15.0 | 8.6 | 6.4 | 18990 | 10888 | 8102 | ○ |
| B26 | 1250 | 0.75 | 16.2 | 10.0 | 6.2 | 20250 | 12500 | 7750 | ○ |
| B27 | 1115 | 0.65 | 22.6 | 16.7 | 5.9 | 25199 | 18621 | 6579 | ○ |
| B28 | 1260 | 0.74 | 15.4 | 9.2 | 6.2 | 19404 | 11592 | 7812 | ○ |
| B29 | 1274 | 0.76 | 15.5 | 9.5 | 6.0 | 19747 | 12103 | 7644 | ○ |
| B30 | 1302 | 0.78 | 14.8 | 9.5 | 5.3 | 19270 | 12369 | 6901 | ○ |
| B31 | 1320 | 0.80 | 13.6 | 7.8 | 5.8 | 17952 | 10296 | 7656 | ○ |
| B32 | 1280 | 0.75 | 14.9 | 9.4 | 5.5 | 19072 | 12032 | 7040 | ○ |
| B33 | 1294 | 0.75 | 15.6 | 9.3 | 6.3 | 20186 | 12034 | 8152 | ○ |
| B34 | 1090 | 0.67 | 22.7 | 16.2 | 6.5 | 24743 | 17658 | 7085 | ○ |
| B35 | 1512 | 0.78 | 14.9 | 10.5 | 4.4 | 22529 | 15876 | 6653 | ○ |
| B36 | 1492 | 0.66 | 9.8 | 6.6 | 3.2 | 14622 | 9847 | 4774 | x |
| B37 | 1675 | 0.56 | 7.5 | 5.6 | 1.9 | 12563 | 9380 | 3183 | x |
| B38 | 1498 | 0.79 | 14.3 | 10.2 | 4.1 | 21421 | 15280 | 6142 | ○ |
| B39 | 1557 | 0.78 | 15.6 | 11.7 | 3.9 | 24289 | 18217 | 6072 | ○ |
| B40 | 1120 | 0.68 | 20.9 | 15.6 | 5.3 | 23408 | 17472 | 5936 | ○ |
| B41 | 1324 | 0.81 | 14.9 | 8.7 | 6.2 | 19728 | 11519 | 8209 | ○ |
| B42 | 1483 | 0.75 | 13.1 | 8.0 | 5.1 | 19427 | 11864 | 7563 | ○ |

The invention examples with the mark of ○ attached thereto in the column of note (test numbers B1, B2, B5, B6, B11, B13, B14, B18, B21 to B23, B25 to B35, and B38 to B42) each had 10000 or more of TS×UEl and 5000 or more of TS×LEl and exhibited good uniform ductility and local ductility. Further, as for YR, they exhibited a high value of 0.59 or more.

Particularly, in the test numbers B1, B5, B6, B11, B18, B23, B26, B27, B29, B30, B32 to B35, B38, and B39, the heating temperature was greater than the $Ac_3$ point and in the first cooling step, the average cooling rate in the temperature zone of the heating temperature to (the heating temperature—50° C.) was 7° C./second or less, and thus the volume fraction of polygonal ferrite was 2.0% or more and $[Mn]_\gamma$/$[Mn]_{ave}$ was 1.10 or more. As a result, samples of these test numbers each had 12000 or more of TS×UEl and 6000 or more of TS×LEl and exhibited particularly good uniform ductility and local ductility.

On the other hand, test results of the steel sheets with the chemical composition or the step conditions being out of the range of the present invention (test numbers with the mark of X attached thereto in the column of note B3, B4, B7 to B10, B12, B15 to B17, B19, B20, B24, B36, and B37) were each poor in one or all of the yield ratio, the uniform ductility, and the local ductility.

Concretely, in the test numbers B7, B19, and B36 in which the steel C, E, or N each having the chemical composition falling within the range of the present invention were used but the skin pass rolling was not performed, the C content in the retained austenite and $[Mn]_\gamma/[Mn]_{ave}$ were low and TS×UEl and TS×LEl were low. In the test number B12 using the steel C, the heat treatment was not performed, and thus the volume fraction of the tempered martensite, the C content in the retained austenite, and $[Mn]_\gamma/[Mn]_{ave}$ were low, and YR, TS×UEl, and TS×LEl were low.

In the test numbers B8, B20, and B37 in which the steel C, E, or N each having the chemical composition falling within the range of the present invention were used but the heat treatment temperature was too low, the volume fraction of the tempered martensite, the C content in the retained austenite, and $[Mn]_\gamma/[Mn]_{ave}$ were low, and YR, TS×UEl, and TS×LEl were low. In the tests using the steel C or F (test numbers B9 and B24), the heat treatment temperature was too high, and thus the volume fraction of the retained austenite and the C content in the retained austenite were low, and YR, TS×UEl, and TS×LEl were low.

In the test number B16 in which the steel C having the chemical composition falling within the range of the present invention was used but the soaking temperature was too low in the annealing step, the volume fraction of the retained austenite and the volume fraction of the tempered martensite were low and TS×UEl was low.

In the tests using the steel A or C (test numbers B3 and B15), the average cooling rate in the temperature zone of 650 to 500° C. was too low in the first cooling step, and thus in the test number B3, the volume fraction of the retained austenite, the volume fraction of the tempered martensite, and $[Mn]_\gamma/[Mn]_{ave}$ were low, and YR and TS×LEl were low. In the test number B15, the volume fraction of the retained austenite and $[Mn]_\gamma/[Mn]_{ave}$ were low, and YR, TS×UEl, and TS×LEl were low.

In the test number B10 in which the steel C having the chemical composition falling within the range of the present invention was used but the average cooling rate (secondary cooling rate) in the temperature zone of the galvannealing temperature to 300° C. was too low in the second cooling step, the volume fraction of the retained austenite and the C content in the retained austenite were low, and TS×UEl and TS×LEl were low.

In the test number B4 using the steel B, the Si content in the steel was small, and thus the volume fraction of the retained austenite and the C content in the retained austenite were low, and YR, TS×UEl, and TS×LEl were low. In the test number B17 using the steel D, the Mn content in the steel was small, and thus the volume fraction of the retained austenite and $[Mn]_\gamma/[Mn]_{ave}$ were low, and YR and TS×LEl were low.

INDUSTRIAL APPLICABILITY

As described previously, according to the present invention, it is possible to manufacture and provide a hot-dip galvanized steel sheet and an alloyed galvannealed steel sheet that are excellent in uniform ductility and local ductility, high in yield strength and tensile strength, and further excellent in formability and impact absorbability. The hot-dip galvanized steel sheet and the alloyed galvannealed steel sheet manufactured by the present invention are most suitable for structural components of an automobile vehicle body such as a member and a pillar, and thus the present invention has high industrial applicability.

The invention claimed is:
1. A metal coated steel sheet, wherein
   a chemical composition contains, in mass %,
   C: 0.03% to 0.70%,
   Si: 0.25% to 2.50%,
   Mn: 1.00% to 5.00%,
   P: 0.100% or less,
   S: 0.010% or less,
   sol. Al: 0.001% b 2.500%,
   N: 0.020% or less,
   Ti: 0% to 0.300%,
   Nb: 0% to 0.300%,
   V: 0% to 0,300%,
   Cr: 0% to 2.000%,
   Mo: 0% to 2.000%,
   B: 0% to 0.0700%,
   Cu: 0% to 2.000%,
   Ni: 0% to 2.000%,
   Ca: 0% to 0.0100%,
   Mg: 0% to 0.0100%,
   REM: 0% to 0.1000%,
   Bi: 0% to 0.0500%, and
   a balance comprising of iron and impurities,
   a metal structure contains greater than 90 vol % and less than 30.0 vol % of retained austenite, greater than 5.0 vol % and 74.2 vol % or less of tempered martensite and 35 vol % or less of polygonal ferrite,
   a C content in the retained austenite is 0.85 mass % or more, and
   the value of TS×UEl is 10000 MPa·% or more, the value of TS×LEl is 5000 MPa·% or more, and the value of YR is 0.72 or more, wherein IS represents tensile strength represents uniform elongation, LEl represents local elongation, and YR represents yield ratio.
2. The metal coated steel sheet according to claim 1, wherein
   the metal structure contains greater than 2.0 vol % and 35 vol % or less of polygonal ferrite, and
   a Mn content in the retained austenite satisfies Expression (1) below,

$$[Mn]_\gamma/[Mn]_{ave} \geq 1.10 \tag{1}$$

$[Mn]_\gamma$: Mn content in retained austenite (mass %)
   $[Mn]_{ave}$: content of the chemical composition of the steel sheet (mass %).
3. The metal coated steel sheet according to claim 1, wherein
   the chemical composition further contains, in mass %, at least one selected from the group consisting of
   Ti: 0.001% to 0.300%,
   Nb: 0.001% to 0.300%, and
   V: 0001% to 0.300%.
4. The metal coated steel sheet according to claim 1, wherein
   the chemical composition further contains, in mass %, at least one selected from the group consisting of
   Cr: 0.001% to 2.000%,
   Mo: 0.001% to 2,000%, and
   B: 0.0001% to 0.0200%.
5. The metal coated steel sheet according to claim 1, wherein
   the chemical composition further contains, in mass %, at least one selected from the group consisting of
   Cu: 0.001% to 2.000%, and
   Ni: 0.001% to 2.000%.

6. The metal coated steel sheet according to claim 1, wherein
the chemical composition further contains, in mass %, at least one selected from the group consisting of
Ca: 0.0001% to 0.0100%,
Mg: 0.0001% to 0.0100%, and
REM: 0.0001% to 0.1000%.

7. The metal coated steel sheet according to claim 1, wherein
the chemical composition further contains, in mass %,
Bi: 0.0001% to 0.0500%.

8. The metal coated steel sheet according to claim 1, wherein
the metal coated steel sheet is a hot-dip galvanized steel sheet including a hot-dip galvanizing layer.

9. The metal coated steel sheet according to claim 1, wherein
the metal coated steel sheet is an alloyed galvannealed steel sheet including an alloyed galvannealing layer.

10. A manufacturing method of a hot-dip galvanized steel sheet, comprising:
a step of performing annealing by heating, to greater than $Ac_1$ point, an original material steel sheet having a chemical composition comprising, in mass %,
C: 0.03% to 0.70%,
Si: 0.25% to 2.50%,
Mn: 1.00% to 5.00%,
P: 0.100% or less,
S: 0,010% or less,
sol. Al: 0.001% to 2.500%,
N: 0.020% or less,
Ti: 0% to 0.300%,
Nb: 0% to 0.300%,
V: 0% to 0.300%,
Cr: 0% to 2.000%,
Mo: 0% to 2.000%,
B: 0% to 0.0200%,
Cu: 0% to 2.000%,
Ni: 0% to 2.000%,
Ca: 0% to 0.0100%,
Mg: 0% to 0.0100%,
REM: 0% to 0.1000%,
Bi: 0% to 0.0500%, and
a balance comprising of iron and impurities;
a step of performing first cooling, wherein the annealed material steel sheet is cooled at an average cooling rate of 2° C./second or more and less than 100° C./second in a temperature zone of 650° C. to 500° C. and further cooled down to 500° C. or less after the step of performing the annealing;
a step of performing hot-dip galvanizing on the first cooled material steel sheet after the step of performing the first cooling;
a step of performing second cooling, wherein the hot-dip galvanized material steel sheet is cooled from a plating temperature in the step of performing hot-dip galvanizing to 300° C. at an average cooling rate of 2° C./second or more and further cooled down to 300° C. or less after the step of performing the hot-dip galvanizing;
a step of performing temper rolling on the secondary cooled material steel sheet at an elongation percentage of 0.10% or more after the step of performing the second cooling; and
a step of performing a heat treatment, wherein the temper rolled material steel sheet is heated to a temperature between 200° C. and 600° C. and retained for 1 second or more after the step of performing the temper rolling,
wherein the hot-dip galvanized steel sheet is the metal coated steel sheet according to claim 1.

11. The manufacturing method of the hot-dip galvanized steel sheet according to claim 10, wherein
in the step of performing the annealing, the original material steel sheet is heated to greater than the $Ac_3$ point and annealed, and
after the step of performing the annealing, the annealed material steel sheet is cooled at an average cooling rate of 7° C./second or less in a temperature zone of the heating temperature to the heating temperature minus 50° C.

12. A manufacturing method of an alloyed galvannealed steel sheet, comprising:
a step of performing annealing by heating, to greater than the $Ac_1$ point, an original material steel sheet having a chemical composition comprising, in mass %,
C: 0.03% to 0.70%,
Si: 0.25% to 2.50%,
Mn: 1.00% to 5.00%,
P: 0.100% or less,
S: 0.010% or less,
sol. Al: 0.001% to 2.500%,
N: 0.020% or less,
Ti: 0% to 0.300%,
Nb: 0% to 0.300%,
V: 0% to 0.300%,
Cr: 0% to 2.000%,
Mo: 0% to 2.000%,
B: 0% to 0.0700%,
Cu: 0% to 2.000%,
Ni: 0% to 2.000%,
Ca: 0% to 0.0100%,
Mg: 0% to 0.0100%,
REM: 0% to 0.1000%,
Bi: 0% to 0.0500%, and
a balance comprising of iron and impurities;
a step of performing first cooling, wherein the annealed material steel sheet is cooled at an average cooling rate of 2° C./second or more and less than 100° C./second in a temperature zone of 650° C. to 500° C. and further cooled down to 500° C. or less after the step of performing the annealing;
a step of performing hot-dip galvanizing on the first cooled material steel sheet after the step of performing the first cooling;
a step of performing galvannealing the hot-dip galvanized material steel sheet at galvannealing temperature after the step of performing the hot-dip galvanizing;
a step of performing second cooling, wherein the alloyed galvannealed material steel sheet is cooled from the galvannealing temperature to 300° C. at an average cooling rate of 2° C./second or more and further cooled down to 300° C. or less after the step of performing the galvannealing;
a step of performing temper rolling on the secondary cooled material steel sheet at an elongation percentage of 0.10% or more after the step of performing the second cooling; and
a step of performing a heat treatment, wherein the temper rolled material steel sheet is heated to a temperature between 200° C. and 600° C. and retained for 1 second or more after the step of performing the temper rolling,
wherein the alloyed galvannealed steel sheet is the metal coated steel sheet according to claim 1.

13. The manufacturing method of the alloyed galvannealed steel sheet according to claim 12, wherein
in the step of performing the annealing, the original material steel sheet is heated to greater than the $Ac_3$ point, and annealed, and
after the step of performing the annealing, the annealed material steel sheet is cooled at an average cooling rate of 7° C./second or less in a temperature zone of the heating temperature to the heating temperature minus 50° C.

* * * * *

UNITED STATES PATENT AND TRADEMARK OFFICE
CERTIFICATE OF CORRECTION

PATENT NO. : 11,732,341 B2
APPLICATION NO. : 16/332329
DATED : August 22, 2023
INVENTOR(S) : Jun Haga et al.

It is certified that error appears in the above-identified patent and that said Letters Patent is hereby corrected as shown below:

In the Claims

Column 42, Line 11, in Claim 1:
Please change: "sol. AI: 0.001 % b 2.500%,"
To: --sol. AI: 0.001 % to 2.500%,--

Column 42, Line 15, in Claim 1:
Please change: "V: 0% to 0,300%,"
To: --V: 0% to 0.300%,--

Column 42, Line 18, in Claim 1:
Please change: "B: 0% to 0.0700%,"
To: --B: 0% to 0.0200%,--

Column 42, Line 26, in Claim 1:
Please change: "contains greater than 90 vol % and less"
To: --contains greater than 9.0 vol % and less--

Column 42, Lines 34-35, in Claim 1:
Please change: "wherein IS represents tensile strength represents uniform elongation, LEI represents"
To: --wherein TS represents tensile strength, UEI represents uniform elongation, LEI represents--

Column 42, Line 46, in Claim 2:
Please change: "[Mn]$_{ave}$: content"
To: --[Mn]$_{ave}$: Mn content"--

Column 42, Line 54, in Claim 3:
Please change: "V: 0001% to 0.300%"
To: --V: 0.001% to 0.300%--

Signed and Sealed this
Eighth Day of October, 2024

Katherine Kelly Vidal
*Director of the United States Patent and Trademark Office*

CERTIFICATE OF CORRECTION (continued)
U.S. Pat. No. 11,732,341 B2

Column 42, Line 60, in Claim 4:
Please change: "Mo: 0.001% to 2,000%,"
To: --Mo: 0.001% to 2.000%,--

Column 43, Line 16, in Claim 8:
Please change: "galvanizing laver."
To: --galvanizing layer--

Column 43, Line 30, in Claim 10:
Please change: "S: 0,010% or less,"
To: --S: 0.010% or less,--

Column 44, Line 32, in Claim 12:
Please change: "B: 0% to 0.0700%,"
To: --B: 0% to 0.0200%,--